United States Patent
Suetsugu

(10) Patent No.: US 8,417,768 B2
(45) Date of Patent: Apr. 9, 2013

(54) COMMUNICATION TERMINAL COMMUNICATING VIA COMMUNICATION NETWORK

(75) Inventor: Junji Suetsugu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/992,685

(22) PCT Filed: Oct. 1, 2009

(86) PCT No.: PCT/JP2009/067150
§ 371 (c)(1),
(2), (4) Date: Nov. 15, 2010

(87) PCT Pub. No.: WO2010/041587
PCT Pub. Date: Apr. 15, 2010

(65) Prior Publication Data
US 2011/0072083 A1 Mar. 24, 2011

(30) Foreign Application Priority Data
Oct. 9, 2008 (JP) ................... 2008-262820

(51) Int. Cl.
*G06F 13/00* (2006.01)
*G06F 15/16* (2006.01)
*G06F 15/173* (2006.01)
(52) U.S. Cl. ......... 709/203; 709/204; 709/205; 709/225
(58) Field of Classification Search .......... 709/203–207, 709/218–219, 223
See application file for complete search history.

(56) References Cited

U.S. PATENT DOCUMENTS

| | | | | |
|---|---|---|---|---|
| 6,081,830 | A * | 6/2000 | Schindler | 709/204 |
| 7,111,044 | B2 * | 9/2006 | Lee | 709/204 |
| 7,634,073 | B2 * | 12/2009 | Kanada | 379/202.01 |
| 7,689,657 | B2 * | 3/2010 | Daniell et al. | 709/206 |
| 7,722,467 | B2 * | 5/2010 | Tabata | 463/42 |
| 2002/0007396 | A1 * | 1/2002 | Takakura et al. | 709/205 |
| 2002/0174234 | A1 * | 11/2002 | Trovato et al. | 709/227 |
| 2007/0124403 | A1 | 5/2007 | Umezawa et al. | |
| 2007/0161392 | A1 | 7/2007 | Ono et al. | |
| 2007/0260730 | A1 * | 11/2007 | Gadwale | 709/224 |
| 2011/0055393 | A1 * | 3/2011 | Akabane | 709/225 |

FOREIGN PATENT DOCUMENTS

| | | |
|---|---|---|
| JP | 2004-40698 A | 2/2004 |
| JP | 2006-107282 A | 4/2006 |
| JP | 2006-350628 A | 12/2006 |
| JP | 2007-72529 A | 3/2007 |
| JP | 2007-140696 A | 6/2007 |
| JP | 2007-183801 A | 7/2007 |
| JP | 2008-134707 A | 6/2008 |
| WO | WO 01/05142 A1 | 1/2001 |

* cited by examiner

Primary Examiner — Hassan Kizou
Assistant Examiner — Amy Ling
(74) Attorney, Agent, or Firm — Birch, Stewart, Kolasch & Birch, LLP

(57) ABSTRACT

In response to an input unit inputting a request for communication, a room ID generation generates a room ID in accordance with presence information detected of a mobile phone, and transmits to a server device a request including the generated room ID for establishing a room. When a presence monitoring unit detects that the status of the mobile phone has changed from that obtained when the input unit input the request for communication, a room deletion request unit transmits to the server device a request including the generated room ID for deleting a room.

8 Claims, 22 Drawing Sheets

FIG.6

| FLAG | ROOM ID | IP ADDRESS | FLAG | NUMBER OF PEOPLE ALLOWED |
|---|---|---|---|---|
| 1 | PROG_"Reversi" | D:11.22.33.44 ⋮ | 1 ⋮ | 2 |
| 1 | GPS_LAT37/GPS_LON175/ TV_CH08/TV_AREA03 | A:123.45.67.89 B:98.76.54.32 ⋮ | 0 1 ⋮ | 4 |
| 0 | URL_"http://www.sharp.co.jp/index.html"/ TIME_20080801123456 | ⋮ C:111.11.11.11 ⋮ | ⋮ 0 ⋮ | 10 |

431 432 433 434 435 / 43A (A)

| DIRECTION INFORMATION | NORTH |
|---|---|
| SPEED INFORMATION | DIRECTION X  12.2m/s<br>DIRECTION Y  2.1m/s |
| POSITIONAL INFORMATION | LONGITUDE  37°<br>LATITUDE  175°<br>ALTITUDE  10 |
| CHANNEL INFORMATION | CHANNEL  8<br>AREA  3 |
| ⋮ | ⋮ |

(B)

| N |
|---|
| SPD_X12.2/SPD_Y2.1/SPD_Z0 |
| GPS_LAT37/GPS_LON175/GPS_ALT10 |
| TV_CH08/TV_AREA03 |
| ⋮ |

COMMUNICATION TERMINAL COMMUNICATING VIA COMMUNICATION NETWORK

TECHNICAL FIELD

The present invention relates generally to communication terminals and particularly to communication terminals communicating with that of a partner through a room established in a server device.

BACKGROUND ART

Conventionally a system has been provided in which a chat room provided through a network for chatting is utilized to find a chatting companion (or a partner for communication) to perform chat communication. Herein, the chat room is established for each of various topics (or themes). When a user selects a room that matches his/her preference, the user confirms a topic (or theme) for each room in an enormous room name list or uses a keyword to narrow down candidates and thus selects the room that matches his/her preference. As such, there has been a demand for a system helping a user to select a room that matches his/her preference.

To meet this demand, for example, Japanese Patent Laying-open No. 2004-40698 (patent document 1) has proposed a chat system. More specifically, patent document 1 discloses a chat system helping a user who is currently watching a TV program and desires to talk with someone about the TV program to find a chatting companion. More specifically, the user transmits to a management system the information identifying the currently watched program and his/her intention to join a chat, and when the management system receives two or more intensions to join the chat for the same program, the management system forms a chat room and returns information of the formed chat room to the senders of the intensions to join the chat.

PRIOR ART DOCUMENTS

Patent Document
Patent Document 1: Japanese Patent Laying-open No. 2004-40698

SUMMARY OF THE INVENTION

Problems to be Solved by the Invention

In patent document 1, the management system does not return information of a chat room to a user before the management system receives two or more intensions to join a chat for a single program. As such, there is a time lag caused after the user transmits his/her intention to join the chat before the user receives a reply. When the user is watching a TV program via a mobile terminal, this time lag causes the following problem:

When a long period of time is required before receiving two or more intensions to join the chat and thus there is a large time lag, there is a large possibility that during that time lag, the user and hence his/her mobile terminal move out of the coverage of a broadcast signal of the TV program. The user outside the coverage cannot watch the TV program, and if in that condition the user receives information of the chat room from the management system, the user cannot achieve his/her initial object, i.e., talk with someone about the TV program that the user currently watches. Thus the chat system of patent document 1 does not consider that the status of the reception of a broadcast signal by a user terminal having transmitted an intention to join a chat can vary from time to time, and the chat system of patent document 1 is thus not excellent in practicability.

The present invention therefore contemplates a communication terminal that allows an established room to be deleted when the communication terminal's current status has changed from a status that the communication terminal had when the room was established.

Means for Solving the Problems

The present invention in one aspect provides a communication terminal communicating via a communication network connecting a server device, including: a presence detection unit for detecting a status of the communication terminal; a communication request unit operated for inputting a request for communication, via a room established in the server device for communicating data with one or more other communication terminals; an identification generation unit for generating room identification data based on the status detected by the presence detection unit for identifying the room; a room establishment request unit operative in response to the communication request unit inputting the request for communication, for transmitting to the server device an establishment request including the room identification data generated by the identification generation unit for establishing the room; a presence variation detection unit for detecting that a current status of the communication terminal detected by the presence detection unit has changed from a status that the presence detection unit detected when the communication request unit input the request for communication; and a room deletion request unit for transmitting a deletion request including the room identification data generated by the identification generation unit to the server device for deleting the room when the presence variation detection unit has detected that the status of the communication terminal has changed.

Preferably, the communication terminal is previously assigned terminal identification data identifying the communication terminal for communication via the communication network. When the room corresponding to the room identification data included in the establishment request transmitted by the room establishment request unit has already been established in the server device, the communication terminal receives from the server device the terminal identification data previously associated with the room identification data included in the establishment request.

Preferably, the communication terminal is previously assigned terminal identification data identifying the communication terminal for communication via the communication network. The communication terminal stands by after the room establishment request unit transmits the establishment request until a request using the terminal identification data for communication is received from any of the one or more other communication terminals. While the communication terminal stands by when the presence variation detection unit detects that the status of the communication terminal has changed the room deletion request unit transmits to the server device the deletion request including the room identification data generated by the identification generation unit for deleting the room.

Preferably, the presence detection unit detects at least a current position of the communication terminal as the status of the communication terminal.

Preferably, the communication terminal further includes a broadcast reception unit for receiving a broadcast signal, wherein the presence detection unit detects as the status of the communication terminal at least a channel of the broadcast signal currently received by the broadcast reception unit.

The present invention in another aspect provides a communication method employing a computer included in a communication terminal communicating via a communication network connecting a server device. The communication method includes the steps of: the computer detecting a status of the communication terminal; the computer inputting a request for communication, via a room established in the server device for communicating data with one or more other communication terminals; the computer generating room identification data based on the detected status for identifying the room; the computer operating in response to the request for communication being input to transmit to the server device an establishment request including the generated room identification data for establishing the room; the computer detecting that a current status detected of the communication terminal has changed from a status detected when the request for communication was input; and when the computer detects that the status of the communication terminal has changed, the computer transmitting to the server device a deletion request including the generated room identification data for deleting the room.

The present invention in still another aspect provides a communication program for causing a computer to execute the above communication method, and a machine readable storage medium having that communication program stored therein.

The present invention in still another aspect provides a system including a plurality of communication terminals and a server device interconnected via a communication network, having the following feature:

The communication terminals each include: a presence detection unit for detecting a status of the communication terminal; a communication request unit operated for inputting a request for communication, via a room established in the server device for communicating data with one or more other communication terminals; an identification generation unit for generating room identification data based on the status detected by the presence detection unit for identifying the room; a room establishment request unit operative in response to the communication request unit inputting the request for communication, for transmitting an establishment request to the server device for establishing the room, the establishment request including the room identification data generated by the identification generation unit and terminal identification data assigned to the communication terminal for communication via the communication network; a presence variation detection unit for detecting that a current status of the communication terminal detected by the presence detection unit has changed from a status that the presence detection unit detected when the communication request unit input the request for communication; and a room deletion request unit for transmitting a deletion request including the room identification data generated by the identification generation unit to the server device for deleting the room once the presence variation detection unit has detected that the status of the communication terminal has changed. The server device includes a room storage unit for storing information of the room. When the room is to be established in response to the establishment request received, the server device associates the room identification data and the terminal identification data of the received establishment request with each other in association with the room, and thus stores the data to the room storage unit. The server device deletes in response to the deletion request from the room storage unit an association of the terminal identification data with the room identification data previously stored in the room storage unit in response to the establishment request.

A specific example of the above terminal identification includes an Internet Protocol (IP) address described hereinafter.

Effects of the Invention

In accordance with the present invention, when a communication terminal's current status is detected to have changed from its status as detected when a communication request unit input a request for communication, a deletion request is transmitted to a server device to delete a room established in response to that request for communication. The established room can be deleted in response to the communication terminal's current status having changed from a status that the communication terminal had when the room was established.

BRIEF DESCRIPTION OF THE DRAWINGS

FIG. 6 shows one example of a room ID table according to the present embodiment.

FIGS. 10(A) and 10(B) illustrate a rule applied to convert presence information to a room ID according to the present embodiment.

MODES FOR CARRYING OUT THE INVENTION

Figure 1:
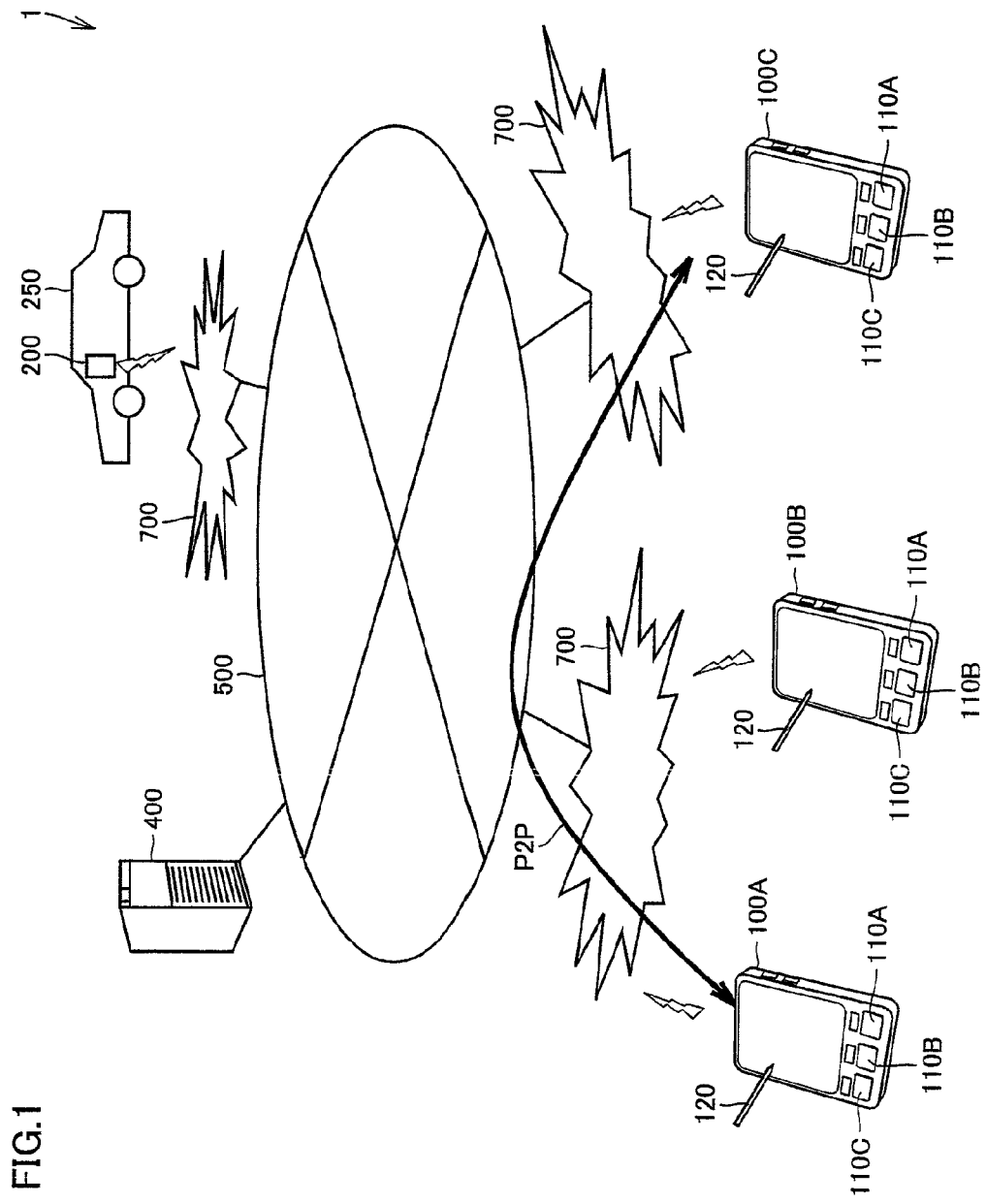
FIG. 1 shows a configuration of a communication network according to the present embodiment.

Hereinafter reference will be made to the drawings to describe the present invention in embodiment. In the following description, identical components are denoted by identical reference characters. Their names and functions are also identical. Accordingly, they will not be described repeatedly in detail.

Hereinafter, a mobile phone 100 will be referred to as a representative example of a "communication terminal" that is a mobile terminal and has functions to receive television (TV) broadcast signals, detect position, and the like. However, it may be any communication terminal having such functions, including a personal computer, a car navigation device (a satellite navigation system), a personal navigation device (PND), a personal data assistant (PDA) or other similar information communication devices.

In the present embodiment, a communication terminal's status is detected and indicated in information referred to as presence information. The presence information is used to establish a chat room, as will be described hereinafter. The communication terminal's status is indicated for example by: the communication terminal's position; the communication terminal's direction, speed and acceleration as it moves; the uniform resource locator (URL) of the content(s) currently output at the communication terminal; information of the channel of a TV program currently received by the communication terminal (or currently watched by the user) or the like; information of the content(s) currently reproduced in the communication terminal; information of a program running in the communication terminal; information of a destination of communication with the communication terminal, communicated data and the like; video or audio information that the communication terminal inputs; information of an amount of light received by the communication terminal; information of the temperature around the communication terminal; and the like. In the present embodiment, presence information indicating: the communication terminal's status in its movement; the status of the reception of a signal (including a broadcast signal) by the communication terminal; and the like is presented to simplify the description. More specifically, the presence information is exemplified by the communication terminal's position, the communication terminal's direction and speed in its movement, and information of the channel of a TV broadcast currently received.

Description of Chat Room

In the present embodiment, a "chat" indicates such a communication that communication terminals mutually communicate messages in real time by on-lines services via the Internet 500 or a carrier network 700 described hereinafter. For example, it may be P2P type data communication which does not depend on a mail server and employs an IP address, as will be described hereinafter, or may be exchanging electronic mail via a mail server. Furthermore, the chat includes a one-on-one chat between communication terminals, and a chat between a larger number of (i.e., three or more) (people or) communication terminals.

A chat room is typically established for each theme/topic. In the present embodiment, it is established for each room identification (ID) generated in accordance with presence information of a communication terminal. The room ID is information for identifying a room uniquely, and corresponds to a so called room name. In the present embodiment, a "chat room" (hereinafter also referred to simply as a "room") indicates information for associating the identification information of a user requesting data communication (or requesting exchanging data) for a chat, i.e., the identification information of the communication terminal of the user, mutually in association with the room ID of the room. The identification information is information for identifying each communication terminal uniquely, and in the present embodiment, it is assumed as an IP address assigned to each communication terminal.

In the present embodiment, "establishing a room" corresponds to generating a room. More specifically, it corresponds to an operation of storing a new room ID to a predetermined memory area and also storing in association with the room ID the identification information of the communication terminal of the user who requests generating a room.

"Entering a room" corresponds to an operation of storing the identification information of the communication terminal of a user who requests a chat in association with a room ID having stored in the predetermined memory area, and also distributing to that user the identification information of the communication terminal(s) of the other user(s).

"Deleting a room" indicates an operation of deleting from the predetermined memory area the room ID of a room to be deleted.

"Canceling entry in a room" indicates an operation of deleting the identification information of a communication terminal stored in association with a room ID.

The above deletion process may be a process for actually erasing the information from the predetermined memory area or may be a process for setting the stored information in a status prohibiting reading the information from the predetermined memory area. In the present embodiment, the information is set in the status prohibiting reading the information (an unreadable status).

Single Mode and Multimode

In the present embodiment, a room is established/deleted in a process in two operation modes, i.e., a single mode and a multimode. The single mode indicates an operation mode allowing only a user who has established a chat room to delete the chat room. More specifically, the single mode indicates an operation mode in which when a user who has established a chat room (hereinafter referred to as "the user of interest") after the chat room has been established does not receive a peer-to-peer (P2P) data communication request, which will be described hereinafter, from another user for a period of time and if during that period of time the presence information of the user of interest has changed, then the user of interest is permitted to request deleting the chat room.

The multimode indicates an operation mode allowing each user who is in a chat room including a user who has established the chat room to delete the chat room once his/her presence information has changed. More specifically, it indicates an operation mode in which if each participant user's presence information has changed or if the user inputs an instruction, then, to cancel his/her entry in the room, the user is permitted to request deleting the chat room.

General Configuration of Network System 1

As shown in FIG. 1, a network system 1 includes mobile phones 100A, 100B and 100C, a matching server 400, the Internet 500, and a carrier network 700. According to the present embodiment, network system 1 includes a car navigation device 200 mounted in a vehicle 250. Network system 1 may have a mail server connected thereto for allowing terminals to communicate electronic mail on Internet 500.

To facilitate description, hereinafter, network system 1 according to the present embodiment includes a first mobile phone 100A, a second mobile phone 100B, and a third mobile phone 100C for the sake of illustration. Furthermore, in describing a configuration, a function or the like common to mobile phones 100A, 100B and 100C, the mobile phones will also collectively be referred to as a mobile phone 100. Furthermore, in describing a configuration, a function or the like common to mobile phones 100A, 100B and 100C, and car navigation device 200, they will also collectively be referred to as a communication terminal.

Mobile phone 100 is connectable to carrier network 700. Car navigation device 200 and matching server 400 are connectable to Internet 500.

More specifically, first mobile phone 100A, second mobile phone 100B, third mobile phone 100C, and car navigation device 200 are interconnectable via carrier network 700, a mail server (not shown), Internet 500 and/or the like and capable of mutually transmitting and receiving data. Furthermore, mobile phone 100 and car navigation device 200 are assigned identification information such as a mail address, an Internet protocol (IP) address or the like for identifying their own terminals. In other words, mobile phone 100 and car navigation device 200 can each store in its internal storage medium the identification information of the other communication terminal, and communicate data, as based on that identification information, with the other communication terminal via carrier network 700, Internet 500 and/or the like.

According to the present embodiment, mobile phone 100 and car navigation device 200 utilize their assigned IP addresses to each communicate data with the other communication terminal without depending on the mail server (not shown). Herein, when each communication terminal accesses matching server 400 i.e., when the communication terminal accesses Internet 500, the communication terminal is assigned an IP address by matching server 400 or another server device (not shown) for the sake of illustration. The IP address is assigned in a process known in detail, and accordingly, how the IP address is assigned will not be described in detail.

According to the present embodiment, mobile phone 100 and car navigation device 200 utilize their assigned IP addresses to directly, mutually communicate data on a network. That is, according to the present embodiment, network system 1 includes mobile phone 100 and car navigation device 200 capable of configuring a so-called P2P type network.

Outline of Operation of P2P

According to the present embodiment, communication terminals previously exchange (or obtain) their IP addresses mutually in order to perform P2P type data communication. Once each communication terminal has obtained the IP addresses, the communication terminal performs P2P type data communication to transmit a message, a file, and/or the like to the other communication terminals. A chat is implemented by this P2P data communication.

Hardware Configuration of Mobile Phone 100

Figure 2:
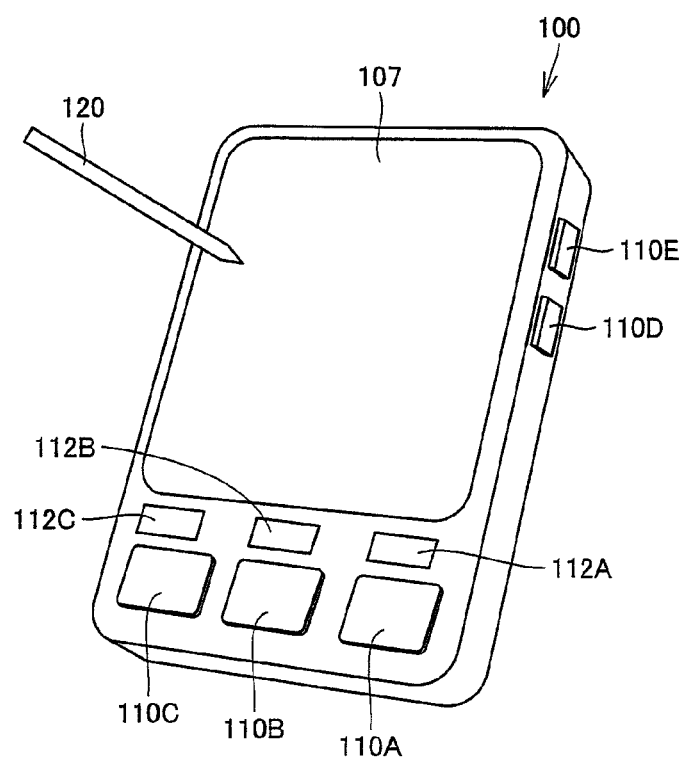
FIG. 2 shows an appearance of a mobile phone according to the present embodiment.
Figure 3:
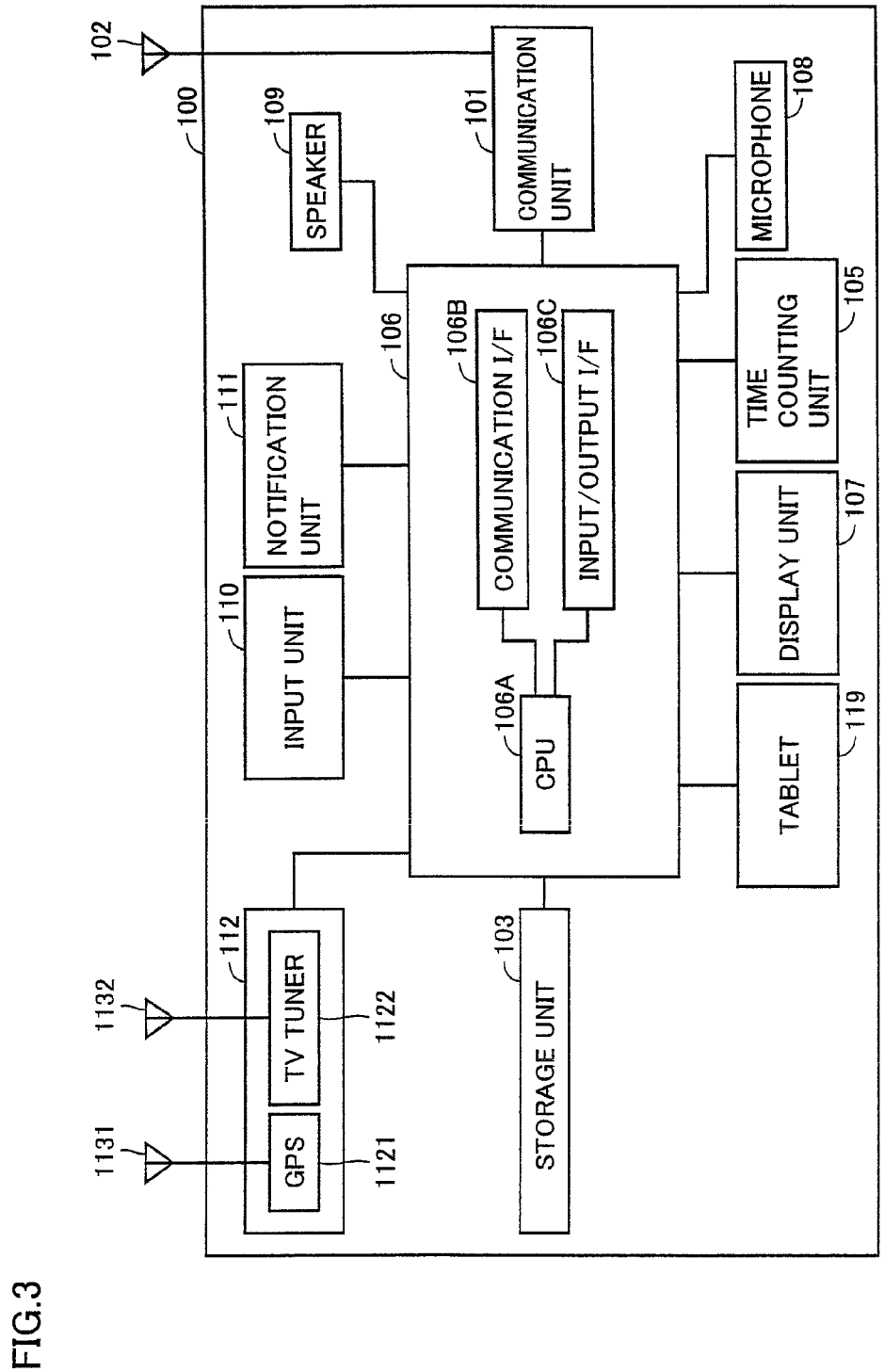
FIG. 3 shows a configuration in hardware of the mobile phone according to the present embodiment.

As shown in FIGS. 2 and 3, according to the present embodiment, mobile phone 100 includes a communication unit 101 communicating data with an external network, a storage unit 103 configured of read only memory (ROM) and random access memory (RAM) storing a program and a variety of types of data, a time counting unit 105, a control unit 106, a display unit 107, a microphone 108, a speaker 109 outputting sound, an input unit 110 receiving a variety of types of information input, a notification unit 111 for audibly or visually outputting a variety of messages indicating for example that externally communicated data, an external voice call signal and/or the like have/has been received, a presence information detection unit 112 for detecting the current status of mobile phone 100, and a tablet 119 for inputting information.

Control unit 106 includes a central processing unit (CPU) 106A, a communication interface (I/F) 106B controlling inputs/outputs between CPU 106A and communication unit 101, and an input/output I/F 106C controlling inputs/outputs between CPU 106A and each unit other than communication unit 101.

Presence information detection unit 112 includes a global positioning system (GPS) 1121 connecting an antenna 1131 for detecting the current position of mobile phone 100 to detect the current status of mobile phone 100, and a TV tuner 1122 connecting an antenna 1132 for receiving a TV broadcast signal.

In addition, presence information detection unit 112 may further include: an acceleration sensor for detecting speed/acceleration; a browser for detecting the URL of the currently displayed content; a content reproducer for detecting information of content being reproduced; an operating system (OS) for detecting information of a running program; a communication device for detecting information of a destination of communication, data that is communicated, and the like; a camera device for detecting information of a video image taken in; a microphone device for detecting information of sound taken in; a photosensor for detecting a quantity of light received; a temperature sensor for detecting ambient temperature; and the like.

According to the present embodiment, display unit 107 is a touch panel configured of a liquid crystal panel, a cathode ray tube (CRT) or the like. More specifically, according to the present embodiment, mobile phone 100 is provided with tablet 119 under (or at a back side of) display unit 107. This allows a user to use a stylus pen 120 or the like to handwrite and thus input graphical information or the like through tablet 119 to control unit 106. Display unit 107 displays an image, text and/or the like based on data output by control unit 106.

Input unit 110 receives information from a user for example operating a key for input. For example, input unit 110 includes a button 110A operated to receive a voice call or make a voice call, a button 110B operated to receive mail or send mail, a button 110C operated to receive P2P type data communication or send P2P type data communication, a button 110D operated to cancel a series of operations, and a button 110E operated to abort a variety of types of processes.

Furthermore, input unit 110 further includes a button 112A operated to request establishing a chat room, a button 112B operated to request deleting a chat room, and a button 112C operated to display information of a chat room to be established or entered.

Contents Stored in Mobile Phone 100

Figure 4:
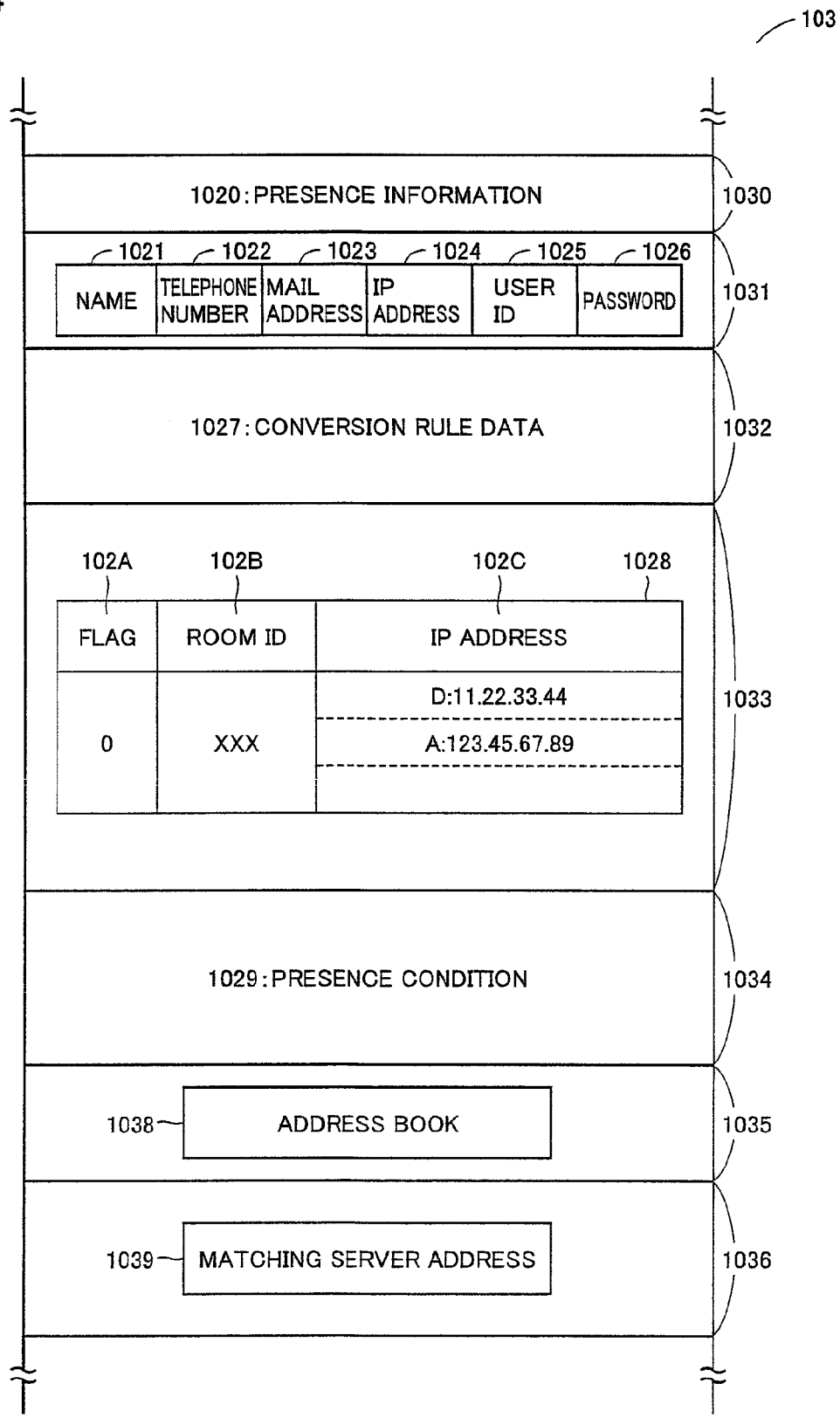
FIG. 4 shows one example of the contents of a storage unit of the mobile phone according to the present embodiment.

With reference to FIG. 4, the mobile phone 100 storage unit 103 includes memory areas 1030-1036. Stored in memory area 1030 is presence information 1020 collected when a chat room is established.

Stored in memory area 1031 are: data 1021 of the name of the user of mobile phone 100; data 1022, 1023 and 1024 of the telephone number, mail address and IP address, respectively, assigned to mobile phone 100; and data 1025 and 1026 of a user ID and a password, respectively, for authentication.

Stored in memory area 1032 is conversion rule data 1027, as will be described hereinafter. Stored in memory area 1033 is a table 1028 storing data corresponding to a chat room established in response to a request of mobile phone 100 or data corresponding to a chat room to be entered. In table 1028 is stored in association with a chat room: data 102A of a flag; data 102B of a room ID for uniquely identifying the room; and data 102C of the IP address of another communication terminal associated via the chat room. Flag data 102A is set to "1" when the corresponding chat room is established, and flag data 102A is updated from "1" to "0" when the corresponding chat room is deleted.

When button 112C is operated, the contents of table 1028 are read from storage unit 103 and displayed on display unit 107. However, data 102B and data 102C with the flag of the corresponding data 102A set at "0" are set in an unreadable status, and thus cannot be read or displayed.

Stored in memory area 1034 is data 1029 of a presence condition selected by the user. How the presence condition is selected will be described later. Stored in memory area 1035 is address book data 1038. Stored in address book data 1038 is data of a partner of communication performed with mobile phone 100, such as the partner's name, mail address, telephone number, and the like. Stored in memory area 1036 is data 1039 of the address of matching server 400. Data 1039 of the address of matching server 400 indicates the URL corresponding to the memory area of a chat room in matching server 400.

Hardware Configuration of Matching Server 400

Figure 5:
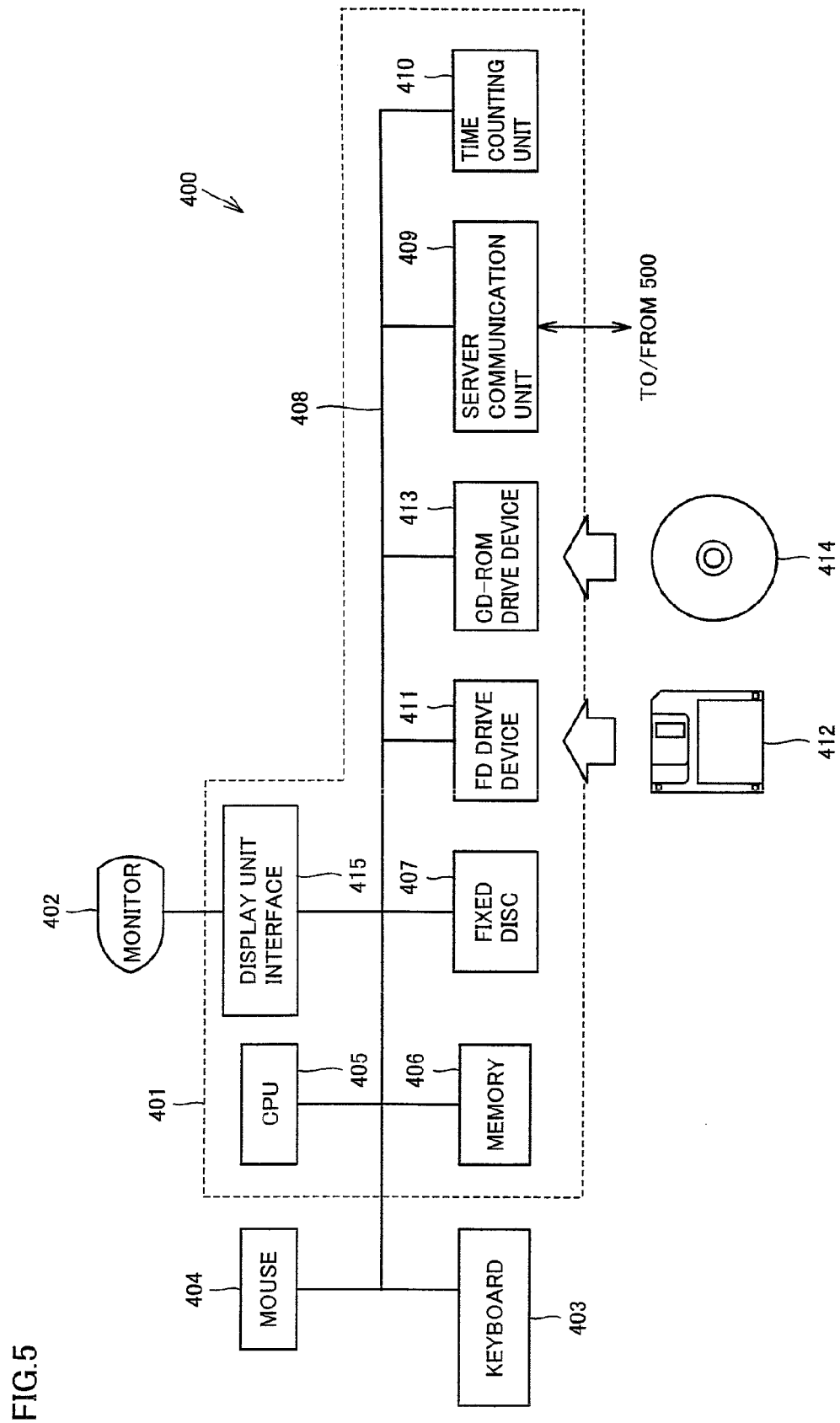
FIG. 5 shows a configuration in hardware of a matching server according to the present embodiment.

With reference to FIG. 5, matching server 400 has a processing unit 401, a monitor 402 constituted of a CRT, liquid crystal or the like, a keyboard 403, and a mouse 404. Processing unit 401 includes a CPU 405 for intensively controlling matching server 400 per se, a memory 406 configured with ROM or RAM included, a fixed disc 407, a flexible disc (FD) drive device 411 accessing an FD 412 detachably attached thereto, a compact disc read only memory (CD-ROM) drive device 413 accessing a CD-ROM 414 detachably attached thereto, a server communication unit 409 connecting Internet 500 and matching server 400 for communication, and a time counting unit 410 constituted of a timer. These units are communicatively connected by an internal bus 408.

Memory 406 stores a variety of types of information, and for example temporarily stores data required for execution of a program in CPU 405. Fixed disc 407 stores a program executed by CPU 405, a database, and the like. CPU 405 controls each element of matching server 400 and is a device performing a variety of types of operations.

Server communication unit 409 receives data output from CPU 405, converts the data to an electrical signal, and externally transmits the signal. Server communication unit 409 also converts an externally received electrical signal to data and inputs the data to CPU 405. More specifically, server communication unit 409 receives data from CPU 405 and transmits the data on Internet 500, carrier network 700, and/or the like to mobile phone 100, car navigation device 200 and/or the like. Server communication unit 409 also receives data via Internet 500 or carrier network 700 from mobile phone 100, car navigation device 200, and/or the like and inputs the data to CPU 405.

What data memory 406 or fixed disc 407 has stored therein will be described hereinafter. FIG. 6 represents a data structure of a room ID table 43A stored in matching server 400 at memory 406 or fixed disc 407.

With reference to FIG. 6, room ID table 43A has stored therein in association with each chat room established in matching server 400: data 431 of a flag; data 432 of a room ID for uniquely identifying the chat room; data 433 of the IP address assigned to the communication terminal of a user entering the chat room; data 434 of a flag; and data 435 of the number of people acceptable.

Data 431 indicates a flag's value, which is set at "1" while the corresponding chat room is established. When the chat room is deleted, the value is updated from "1" to "0", and the corresponding data 432-435 are set in an unreadable status.

Data 434 indicates a flag, which is stored in association with an IP address indicated by data 433. Data 434 indicates the flag's value, which is set at "1" while a user is in a chat room as the corresponding IP address is registered (or stored) in room ID table 43A. When the user's entry is cancelled, the value is updated from "1" to "0" and the corresponding IP address is set in an unreadable status.

Data 435 indicates an acceptable number of users (or a maximum number of people) who are allowed to mutually communicate data via the corresponding chat room. In the present embodiment, the acceptable number of people will not be described in detail.

Functional Configuration of Mobile Phone 100

Figure 7:
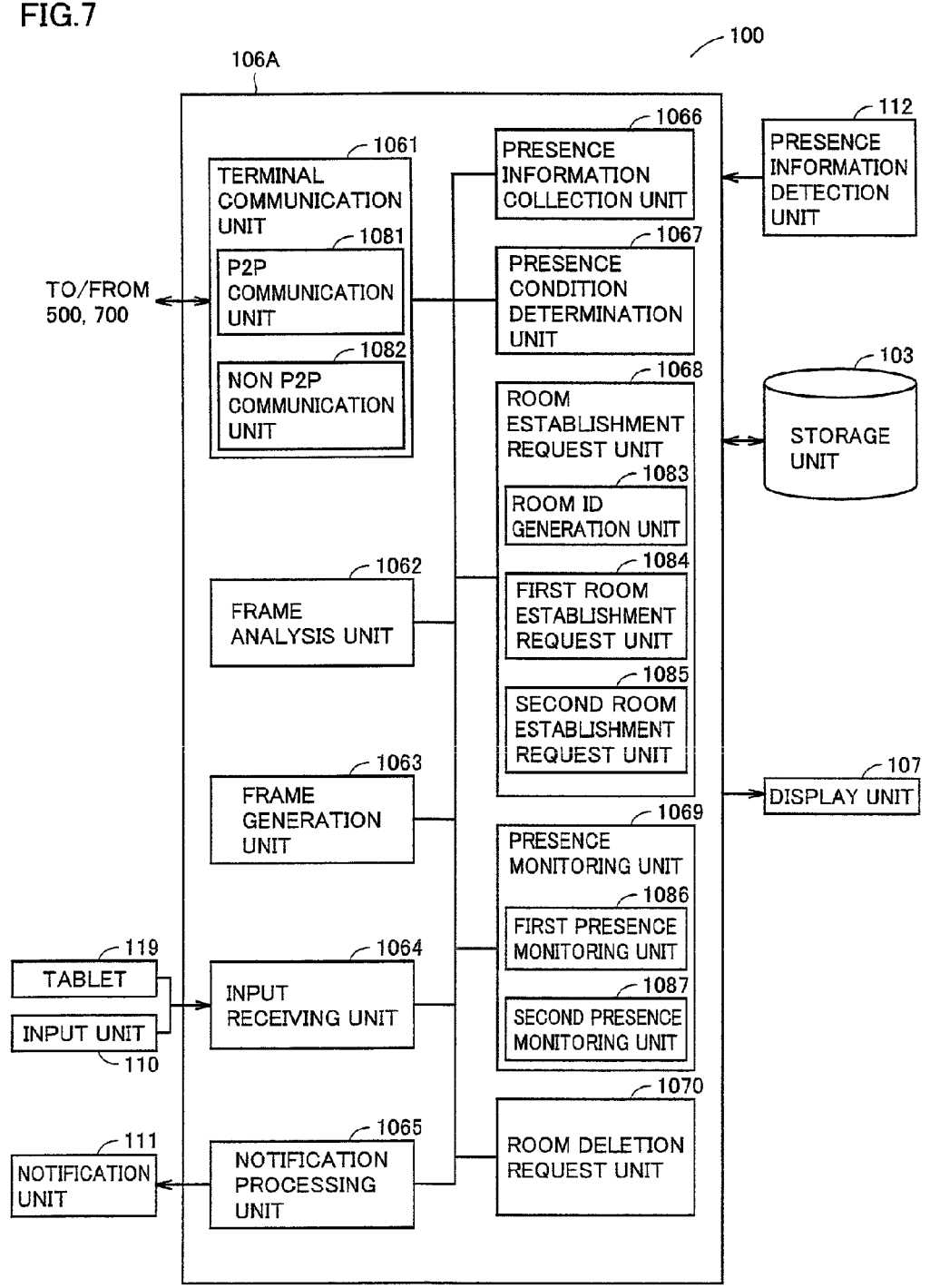
FIG. 7 shows a configuration in function of the mobile phone according to the present embodiment.

With reference to FIG. 7, according to the present embodiment, mobile phone 100 includes a terminal communication unit 1061, a frame analysis unit 1062, a frame generation unit 1063, an input receiving unit 1064, a notification processing unit 1065, a presence information collection unit 1066, a presence condition determination unit 1067, a room establishment request unit 1068, a presence monitoring unit 1069, and a room deletion request unit 1070. Each unit's function is previously stored as program data in storage unit 103 at a predetermined memory area, and is implemented by CPU 106A reading the program data from storage unit 103 and executing the read program data.

FIG. 7 only shows each function that CPU 106A has, and peripheral circuitry inputting/outputting data/information.

Terminal communication unit 1061 includes a P2P communication unit 1081 for controlling P2P data communication using IP addresses, and a non P2P communication unit 1082 for controlling other communications such as voice calls, mail communication, and the like. Frame analysis unit 1062 inputs a frame received by terminal communication unit 1061, analyses the input frames data, and outputs the resultant analysis. Frame generation unit 1063 generates a frame to be transmitted to an external network via terminal communication unit 1061. Input receiving unit 1064 receives data input via tablet 119 and input unit 110. Notification processing unit 1065 provides notification unit 111 with data to be externally output.

Presence condition determination unit 1067 inputs a presence condition determined by a user operating tablet 119 or input unit 110. How the presence condition is determined will be described later.

Presence information collection unit 1066 inputs presence information detected by each unit of presence information detection unit 112. This is referred to as collecting presence information.

Room establishment request unit 1068 requests matching server 400 to establish a room. More specifically, room establishment request unit 1068 includes a room ID generation unit 1083 generating a room ID of a chat room to be established based on presence information collected by presence information collection unit 1066 and a presence condition determined by presence condition determination unit 1067, and a first room establishment request unit 1084 and a second room establishment request unit 1085 corresponding to the single mode and the multimode, respectively.

Presence monitoring unit 1069 includes a first presence monitoring unit 1086 and a second presence monitoring unit 1087 corresponding to the single mode and the multimode, respectively. Presence monitoring unit 1069 compares presence information collected by presence information collection unit 1066 with previously collected presence information to provide a result, and detects therefrom whether the currently collected presence information is different from the previous presence information.

Room deletion request unit 1070 requests matching server 400 to delete a chat room when a user indicates deletion via input unit 110 or when presence monitoring unit 1069 detects that presence information is different.

Functional Configuration of Matching Server 400

Figure 8:
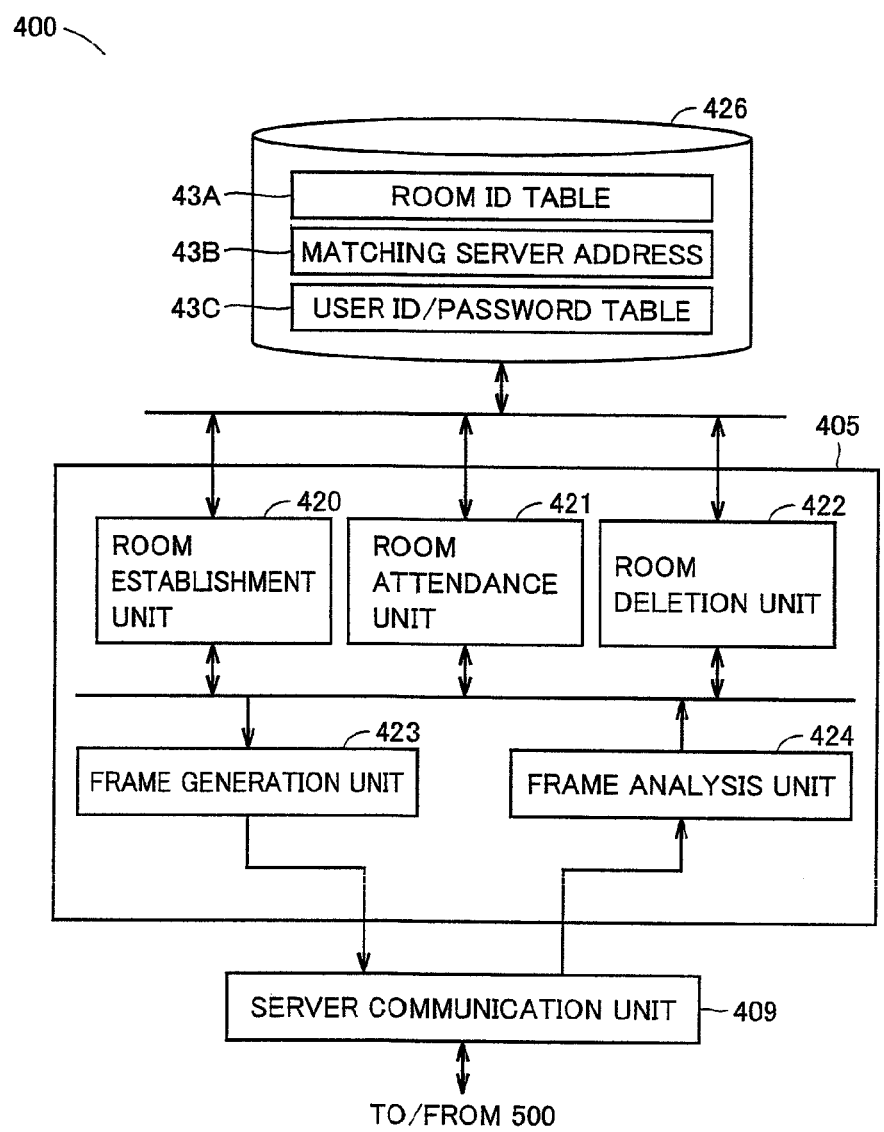
FIG. 8 shows a configuration in function of the matching server according to the present embodiment.

With reference to FIG. 8, matching server 400 includes a room establishment unit 420, a room attendance unit 421, a room deletion unit 422, a frame generation unit 423, and a frame analysis unit 424. These units are each stored previously as program data in fixed disc 407 or memory 406 at a predetermined memory area, and each unit's function is implemented by CPU 405 reading the program data from the predetermined memory area and executing the read program data. Matching server 400 further includes a storage unit 426 constituted of memory 406 and fixed disc 407.

Storage unit 426 has stored therein room ID table 43A, as aforementioned, data 43B of the address of the matching server, and a user ID/password table 43C having a user ID and a password stored therein in association with each other.

Room establishment unit 420 establishes a new chat room to be generated. This is done by storing to storage unit 426 at room ID table 43A the data corresponding to the new chat room to be generated. Room attendance unit 421 performs a process for attending a variety of types of requests received from mobile phone 100 regarding a chat room. Room deletion unit 422 deletes a chat room when room attendance unit 421 attends a request from mobile phone 100 to delete the chat room. Frame generation unit 423 generates a frame of data to be transmitted to Internet 500 via server communication unit 409, and outputs the generated frame to server communication unit 409. Frame analysis unit 424 analyses a frame of data received by server communication unit 409 via Internet 500, and outputs a resultant analysis.

Room ID Generation Process

Room ID generation unit 1083 shown in FIG. 7 has a function, as will now be described hereinafter with reference to FIGS. 9-12.

Figures 10, 11:
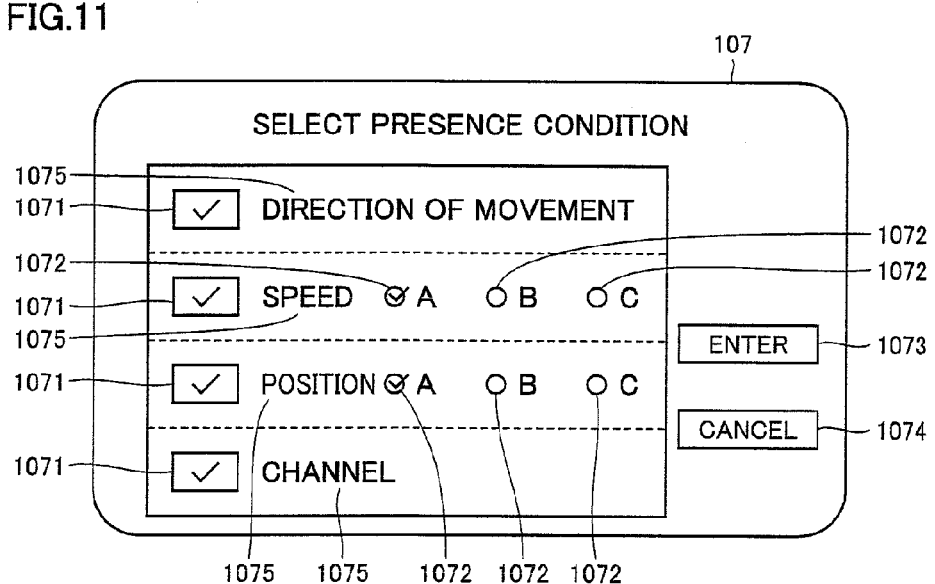
FIG. 11 shows one example of a screen for selecting a presence condition according to the present embodiment.

FIG. 11 shows one example of a screen displayed by presence condition determination unit 1067 on display unit 107 to allow a user to select a presence condition. On the FIG. 11 screen, a plurality of candidate presence conditions 1075 are displayed to determine presence information to be referenced to generate a room ID. Indicated as candidate presence conditions 1075 in FIG. 11 are, for example: the direction and speed of mobile phone 100 as it moves; the current position of mobile phone 100; and the channel of a TV broadcast signal received by mobile phone 100.

A tick box 1071 is indicated for each of candidate presence conditions 1075. The user can operate tablet 119 to tick tick box 1071 corresponding to a desired candidate presence condition 1075 to select presence information to be referenced to generate a room ID.

In FIG. 11, candidate presence conditions 1075 include speed and position with a tick box 1072 further indicated for setting a more detailed condition. For candidate presence condition 1075 of speed, tick box 1072 is indicated for designating how many digits a value in speed to be collected is required to have for precision. Similarly, tick box 1072 is indicated to designate the precision of the current position of mobile phone 100. For speed, three tick boxes 1072 assigned "A", "B", and "C" are displayed. Selectively ticking tick boxes A, B, C 1072 indicates inputting a value in speed with levels of precision of two, three and four digits, respectively. Similarly, for candidate presence condition 1075 of position, selectively ticking tick boxes A, B, C 1072 indicates inputting a positional value with levels of precision of one, two and three digits, respectively.

Display unit 107 also displays a button 1073 operated by the user to select a presence condition and enter what is thus selected, and a button 1074 operated to cancel what has been selected.

When button 1073 is operated, presence condition determination unit 1067 reads information selected by the user via the FIG. 11 screen, and stores the read information as data 1029 of a presence condition to storage unit 103 at memory area 1034.

Figure 9:
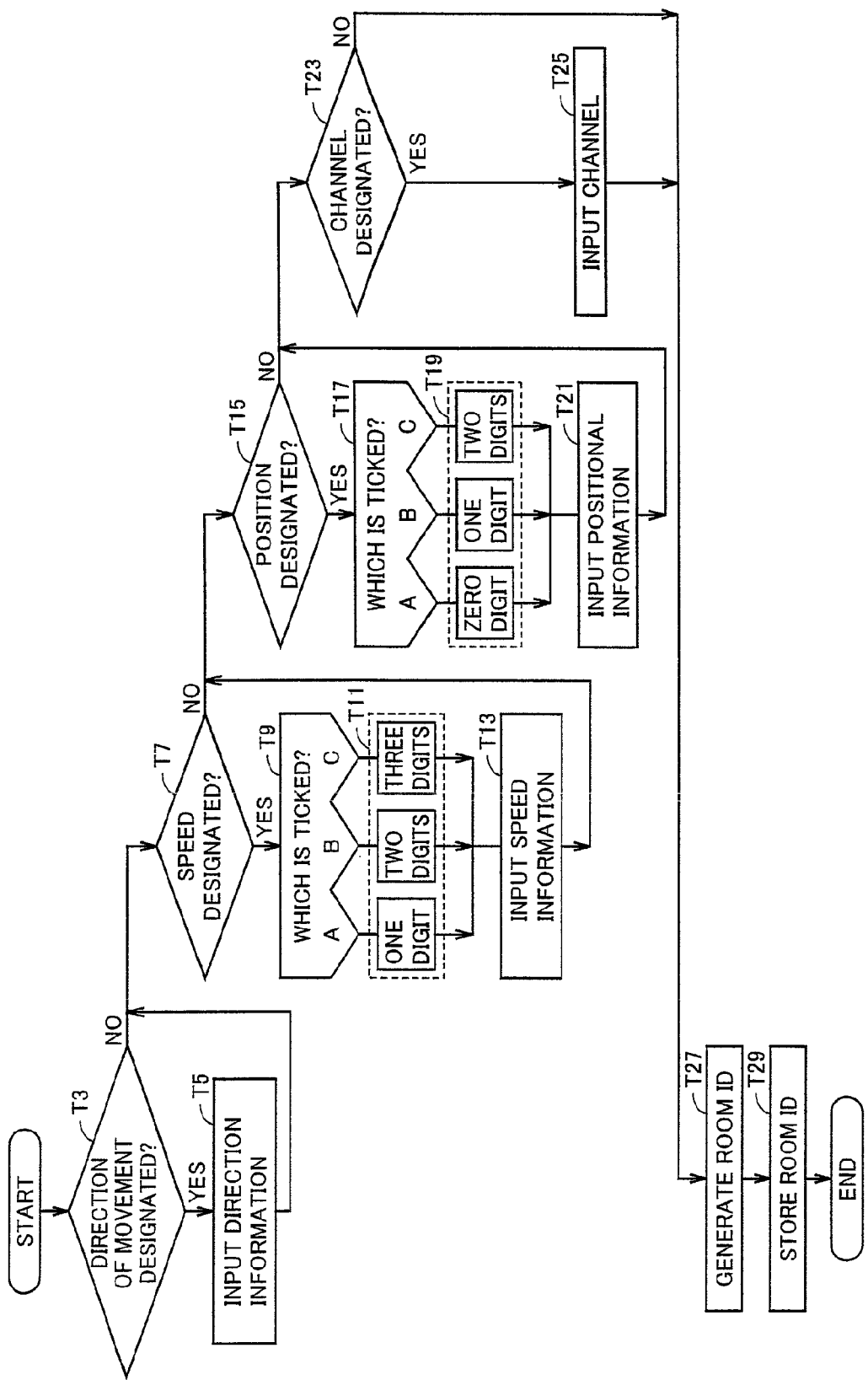
FIG. 9 is a flowchart of a room ID generation process according to the present embodiment.

In accordance with the FIG. 9 flowchart, the room ID generation process will now be described. Note that herein, data 1029 of presence conditions previously designated by the user, as shown on the FIG. 11 screen, is stored in storage unit 103 for the sake of illustration.

Initially, room ID generation unit 1083 inputs presence information collected by presence information collection unit 1066.

More specifically, room ID generation unit 1083 determines from data 1029 of a presence condition read from storage unit 103 whether "direction of movement" has been designated (step T3). If not, the control proceeds to step T7 described later.

If direction of movement has been designated (YES at step T3), then, of presence information input from presence information collection unit 1066, the information of the direction is input (step T5). Then the control proceeds to step T7.

Then, room ID generation unit 1083 determines from data 1029 of a presence condition whether "speed" has been designated (step T7). If not, the control proceeds to step T15 described later.

If "speed" has been designated (YES at step T7), then, it is determined from data 1029 of the presence condition which of tick boxes A-C 1072 for the presence information of speed has been selected (or ticked) (step T9). In accordance with the decision, step T11 is performed to determine a level of precision of speed information to be input. More specifically, selectively inputting a speed's value to one, two and three decimal places corresponding to tick boxes A, B and C, respectively, is indicated. Room ID generation unit 1083 inputs speed information with a level of precision based on the results of steps T9 and T11 (step T13). Then, the control proceeds to step 15.

Similarly, when positional information is input, steps T15, T17 and T19 are performed to input positional information in accordance with a level of precision designated in steps T17 and T19 (step T21). Then, the control proceeds to step T23.

Room ID generation unit 1083 determines from data 1029 of a presence condition whether "channel" has been designated (step T23). If not, the control proceeds to step T27 described later.

If channel has been designated (YES at step T23), then, of presence information input from presence information collection unit 1066, the information of the channel currently tuned in to by TV tuner 1122 is input (step T25). Then, the control proceeds to step T27.

Room ID generation unit 1083 generates a room ID, as based on the presence information input in steps T5, T13, T21 and T25, with reference to conversion rule data 1027 read from storage unit 103 (step T27). The generated room ID is stored as data 102B to table 1028 stored in storage unit 103 at memory area 1033 (step T29). At the time, the flag of data 102A corresponding thereto is set at "0", and for the IP address of data 102C corresponding thereto, null data is set. The room ID generation process thus ends.

With reference to FIG. 10, step T27 is performed to generate a room ID with reference to conversion rule data 1027, as will be described hereinafter.

FIG. 10(A) shows one example of presence information input in steps T5, T13, T21 and T25. This presence information is converted in accordance with a conversion rule that is indicated by conversion rule data 1027 to a data string formed of alphabetical letters, numerals and symbols combined together, as shown in FIG. 10(B). The FIG. 10(B) data strings are combined (e.g., linked) together to generate a room ID based on the presence information. The linked data strings generate a data string, which corresponds to data 432 of FIG. 6.

The FIGS. 12-22 flowcharts represent a process for establishing/deleting a chat room through communication between mobile phone 100 and matching server 400. A program following these flowcharts is previously stored in mobile phone 100 at storage unit 103 and read and executed by CPU 106A. Furthermore, in matching server 400, a program is previously stored in memory 406, fixed disc 407, FD 412 and CD-ROM 414 and read and executed by CPU 405.

Configuration of Communication Frame

In the FIGS. 12-22 process, mobile phone 100 and matching server 400 mutually receive and transmit a frame having a configuration, as will be described hereinafter.

Figure 23:
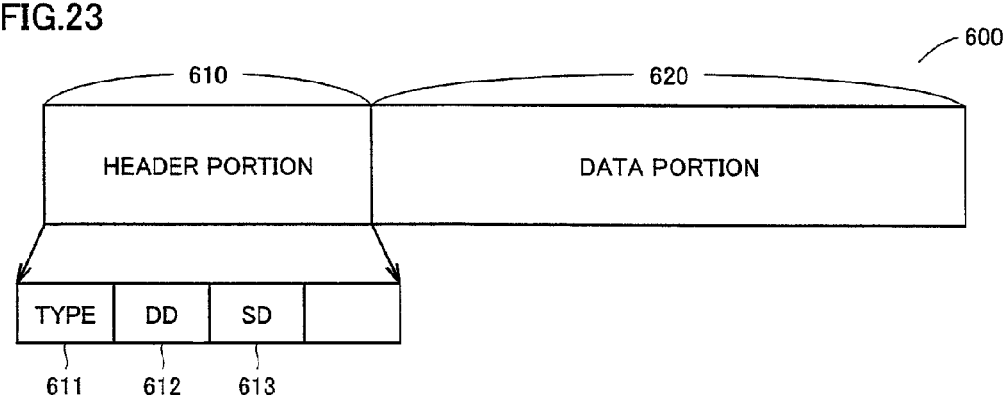
FIG. 23 illustrates a configuration of a frame according to the present embodiment.

With reference to FIG. 23, a frame 600 includes a header portion 610 and a data portion 620. Stored in header portion 610 are: data 611 indicating the type of the frame; data 612 indicating the destination of the frame; and data 613 indicating the source of the frame. Stored in data portion 620 is data to be transmitted.

Data 611 in the present embodiment indicates a type having a value of "1" indicating a request frame or a value of "0" indicating that a request is accepted. In the present embodiment, frame 600 is transmitted and received between mobile phone 100 and matching server 400, and accordingly, stored as data 612 and 613 are data 1023 of a mail address read from the mobile phone 100 storage unit 103 and data 1039 or 43B of the address of the matching server.

Figure 24:
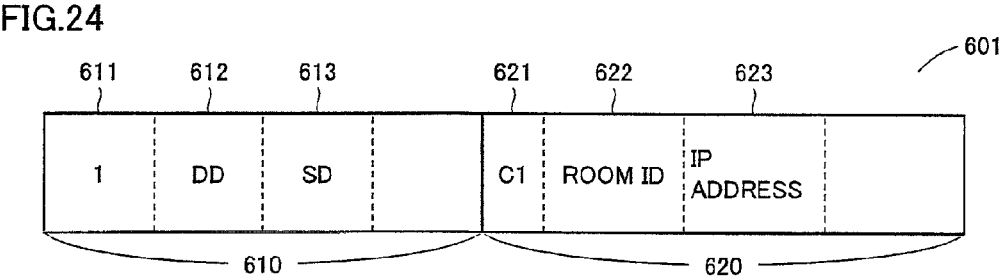
FIG. 24 shows a configuration of a frame of a request to establish a room according to the present embodiment.

When mobile phone 100 requests establishing a chat room, a frame 601 of a request to establish a room, as shown in FIG. 24, is transmitted from mobile phone 100 to matching server 400. Frame 601 has stored therein data 611 indicating "1", and data 612 and 613 of data 1039 of the address of the matching server and mail address 1023, respectively, read from storage unit 103. Data portion 620 has stored therein an instruction code 621, data 622 of a room ID, and data 623 of an IP address. Instruction code 621 indicates a command requesting establishing the room. Stored as data 622 is data 102B of a room ID generated by room ID generation unit 1083 and read from table 1028. Stored as data 623 is data 1024 of an IP address previously assigned to the source, or mobile phone 100, and read from storage unit 103.

Figure 25:
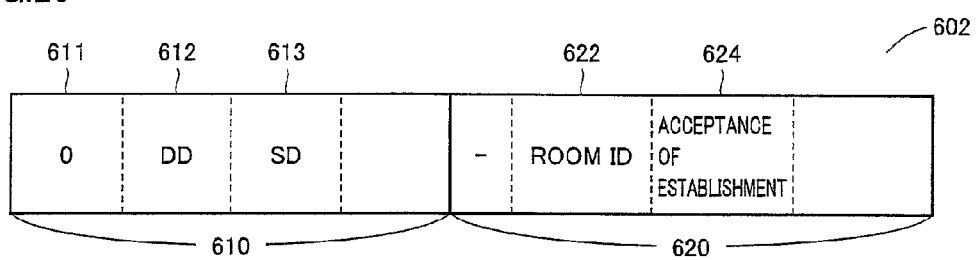
FIG. 25 shows a configuration of a frame of acceptance of establishment of a room according to the present embodiment.

When matching server 400 receives frame 601 of the request to establish the room, matching server 400 generates a frame 602 of acceptance of establishment of the room, as shown in FIG. 25, and transmits frame 602 to mobile phone 100. Frame 602 has header portion 610 having stored therein data 611 indicating "0", and data 612 of data 613 of frame 601 received. Stored as data 613 is data 43B of the address of the matching server read from storage unit 426. Data portion 620 has stored therein instruction code 621 of null data (indicated in the figure by "-"), data 622 of frame 601 received of the request to establish the room, and data 624 indicating that the request to establish the room has been accepted.

Figure 26:
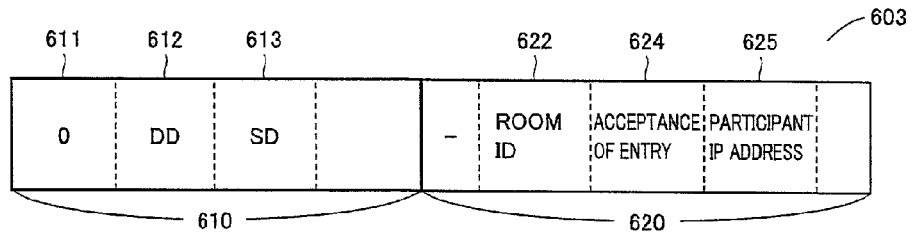
FIG. 26 shows a configuration of a frame of acceptance of entry into a room according to the present embodiment.

If there has been established a chat room having a room ID that matches a room ID indicated by data 622 of frame 601 transmitted by mobile phone 100 to request establishing a room, as shown in FIG. 24, then matching server 400 transmits to mobile phone 100 a frame 603 of acceptance of entry into the room, as shown in FIG. 26. Frame 603 has header portion 610 having stored therein data similar to that of frame 602, and data portion 620 having stored therein data 622 of frame 601 of the request to establish the room. Furthermore, as frame 601 of the request to establish the room is received, data 624 indicating "acceptance of entry" indicating that entry into the chat room has been accepted, and data 625 of the IP address of mobile phone 100 of a user in the chat room are stored.

Figure 27:
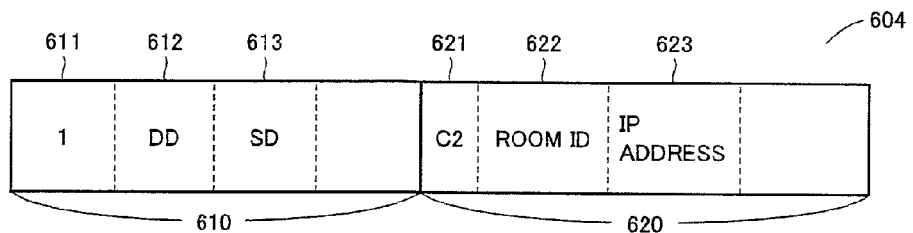
FIG. 27 shows a configuration of a frame of a request to delete a room according to the present embodiment.

When mobile phone 100 requests matching server 400 to delete a chat room, mobile phone 100 transmits to matching server 400 a frame 604 of a request to delete the room, as shown in FIG. 27. Frame 604 has header portion 610 having stored therein data 611 indicating "1", and data 612 and data 613 of data 1039 of the address of the matching server and mail address data 1023, respectively, read from storage unit 103. Furthermore, data portion 620 has instruction code 621, and data 622 and 624 stored therein. Instruction code 621 indicates a command "C2" to request deleting the chat room. Stored as data 622 is the room ID of the chat room to be deleted. More specifically, stored as data 622 is data 102B read from the storage unit 103 table 1028. Stored as data 623 is data 1024 of the IP address of mobile phone 100 read from the storage unit 103 memory area 1031.

Figure 28:
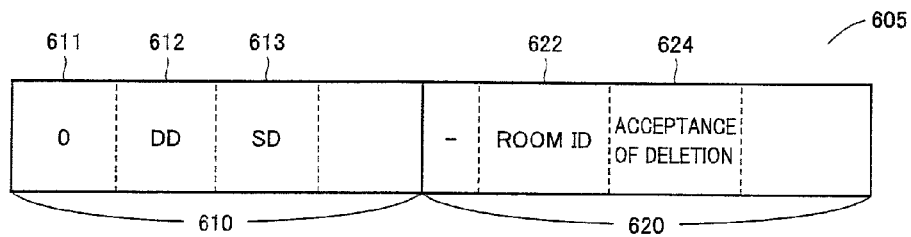
FIG. 28 shows a configuration of a frame of acceptance of deletion of a room according to the present embodiment.

When matching server 400 receives from mobile phone 100 frame 604 of the request to delete the room, matching server 400 transmits to mobile phone 100 a frame 605 of acceptance of deletion of the room, as shown in FIG. 28, indicating that the request has been accepted. Frame 605 has header portion 610 having data 611 indicating "0", data 612 indicating data 613 of frame 604 received, and data 613 indicating data 43B of the address of the matching server read from storage unit 426. In data portion 620, instruction code 621 indicates null data. Furthermore, stored as data 622 is the room ID of the chat room for which the request to delete it is accepted (i.e., the room ID indicated by data 622 of frame 604 of the request to delete the room), and data 624 indicating that the deletion has been accepted is stored.

Reference will now be made to each figure to describe a procedure of each process for establishing/deleting a chat room.

Figure 12:
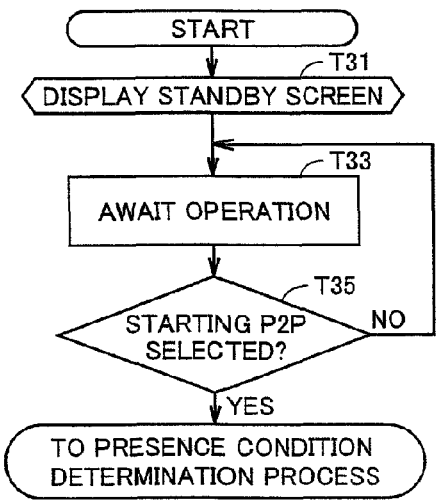
FIG. 12 is a flowchart of a standby process performed in the mobile phone according to the present embodiment.

With reference to FIG. 12 the mobile phone 100 CPU 106A with an operation standby screen displayed determines whether the user has operated the input unit 110 button 110C to input an instruction to start P2P data communication (steps T31, T33 and T35). If so (YES at step T35), the control proceeds to a presence condition determination process. While the instruction to start P2P data communication is not indicated (NO at step T35), steps T33 and T35 are repeated.

Presence Condition Determination Process

Figure 13:
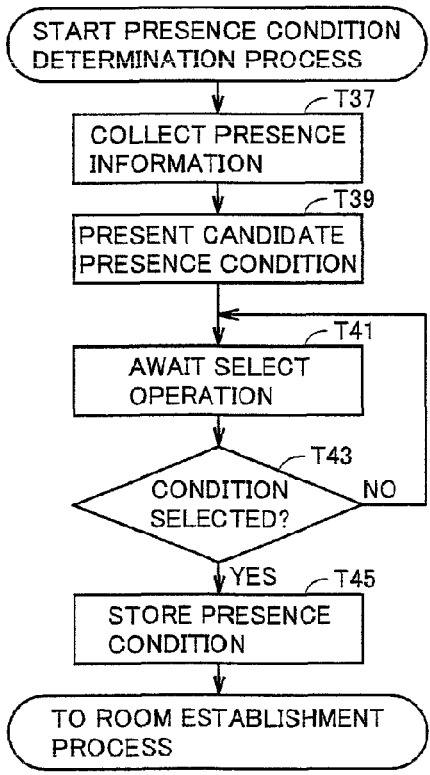
FIG. 13 is a flowchart of a presence condition determination process performed in the mobile phone according to the present embodiment.

Presence condition determination unit 1067 performs the presence condition determination process, as will be described hereinafter with reference to the FIG. 13 flowchart.

Initially, presence condition determination unit 1067 collects presence information through presence information collection unit 1066, as based on an output of the detection done by presence information detection unit 112 (step T37).

Then, the FIG. 11 screen is displayed on display unit 107 to present a plurality of candidate presence conditions 1075 (step T39). Subsequently, candidate presence condition 1075 selected and input by the user operating a pen 120 is awaited (step T41). When a presence condition is selected and ENTER button 1073 is operated (YES in T43), presence condition(s) determined as shown in FIG. 11 is/are input and stored in storage unit 103 at memory area 1034 as data 1029 of the presence condition(s) (step T45). Subsequently, room establishment request unit 1068 performs a room establishment process.

Room Establishment Process in Single Mode

Figure 14:
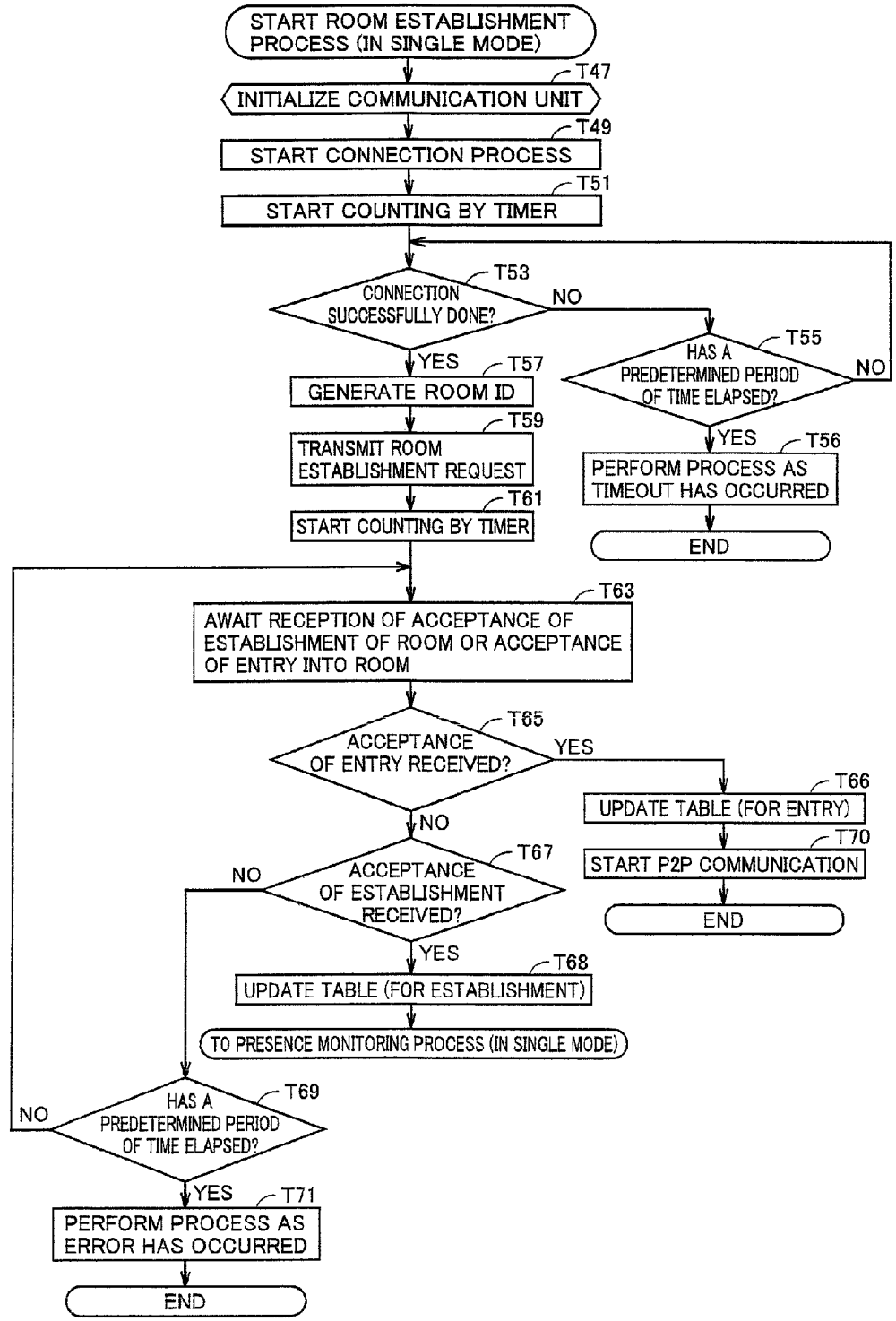
FIG. 14 is a flowchart of a room establishment process in a single mode according to the present embodiment.

First room establishment request unit 1084 performs a room establishment process in the single mode, as will be described hereinafter with reference to the FIG. 14 flowchart.

When room establishment request unit 1068 determines that the single mode has been designated via input receiving unit 1064 by the user operating tablet 119 or input unit 110, room establishment request unit 1068 activates first room establishment request unit 1084. Note that storing mode data in storage unit 103 at a predetermined area whenever the mode data is received via input receiving unit 1064 allows the currently designated mode to be detected from the mode data read from storage unit 103.

First room establishment request unit 1084 performs a process for initializing the communication unit via terminal communication unit 1061 (step T47). In this initialization process, a predetermined procedure is followed to receive an IP address to be assigned to mobile phone 100 of interest, and thus obtain the IP address. The IP address is stored in storage unit 103 at memory area 1031 as data 1024. The IP address may be obtained through communication with matching server 400 or may be obtained through communication with another server (not shown).

Subsequently, a process is performed to connect (or log in) to matching server 400 to start communication (step T49). More specifically, the log in process is performed via an authentication process using user ID 1025 and password 1026 read from storage unit 103. When the log in process is performed, time counting unit 105 starts counting a predetermined period of time required to establish communicative connection to matching server 400 (step T51). When a response is received from matching server 400, and a decision is made that connection to matching server 400 has successfully been done (YES at step T53), the control proceeds to step T57 described later.

If the predetermined period of time has elapsed and still, no response is received from matching server 400, and accordingly, a decision is made that connection to matching server 400 has not been done successfully (NO at step T53, YES at step T55), then, a time out occurs, and accordingly, a process therefor is performed (step T56). More specifically, display unit 107 displays an error message ("failed to connect to matching server 400"), and a process is performed for ending communication with matching server 400 by terminal communication unit 1061.

If connection to matching server 400 has successfully been done (YES at step T53), first room establishment request unit 1084 instructs room ID generation unit 1083 to generate a room ID. Room ID generation unit 1083 responsively generates a room ID in accordance with the FIG. 9 procedure. The generated room ID is stored to the memory area 1033 table 1028 as data 102B.

Subsequently, first room establishment request unit 1084 generates by frame generation unit 1063 the FIG. 24 frame 601 of a request to establish a room, and transmits the generated frame 601 via the terminal transmission unit 1061 non P2P communication unit 1082 to matching server 400 (step T59). Subsequently, time counting unit 105 counts a predetermined period of time for receiving a frame of a response from matching server 400 via non P2P communication unit 1082 (step T61). Whether the FIG. 25 frame 602 of acceptance of establishment of the room or the FIG. 26 frame 603 of acceptance of entry into the room is received from matching server 400 within the predetermined period of time, is detected (steps T63, T65, T67).

A received frames data is analyzed, and if from a result of the analysis it is detected that frame 603 of acceptance of entry into the room has been received (YES at step T65), the table 1028 data is updated (step T66). More specifically, frame 603 received has stored therein data 625 of the IP address of a participant, which is additionally stored to table 1028 as data 102C corresponding thereto. This will store to table 1028 data 625 of the IP address of mobile phone 100 of another user in the chat room of the room ID indicated by data 102B. As having received frame 603 of acceptance of entry into the room is detected from a result of analyzing a received frame, it is determined that the chat room that mobile phone 100 of interest requests has already been established. Accordingly, the value of the flag indicated in table 1028 by data 102A corresponding thereto is updated to "1".

Subsequently, the user of mobile phone 100 uses an IP address stored in table 1028 as data 102C to start a P2P data communication process via P2P communication unit 1081 with mobile phone 100 of another user who is a participant in the chat room (step T70), and thereafter, P2P data communication is performed.

If matching server 400 does not respond by entry acceptance frame 603 (NO at step T65) but frame 602 of acceptance of establishment of the room (YES at step T67), the table 1028 data is updated (step T68). More specifically, table 1028 is searched in accordance with data 622 of a room ID stored in frame 602 received, and the value of the flag indicated by data 102A corresponding to data 102B of a room ID hit is updated to "1". Subsequently, presence monitoring unit 1069 performs a presence monitoring process.

If neither entry acceptance frame 603 nor establishment acceptance frame 602 is received and a predetermined period of time has elapsed (YES at step T69), first room establishment request unit 1084 performs a process as an error associated with a communication protocol has occurred (step T71). For example, display unit 107 displays an error message ("there is no response from the matching server.") and the communication process by terminal communication unit 1061 is ended.

Figure 15:
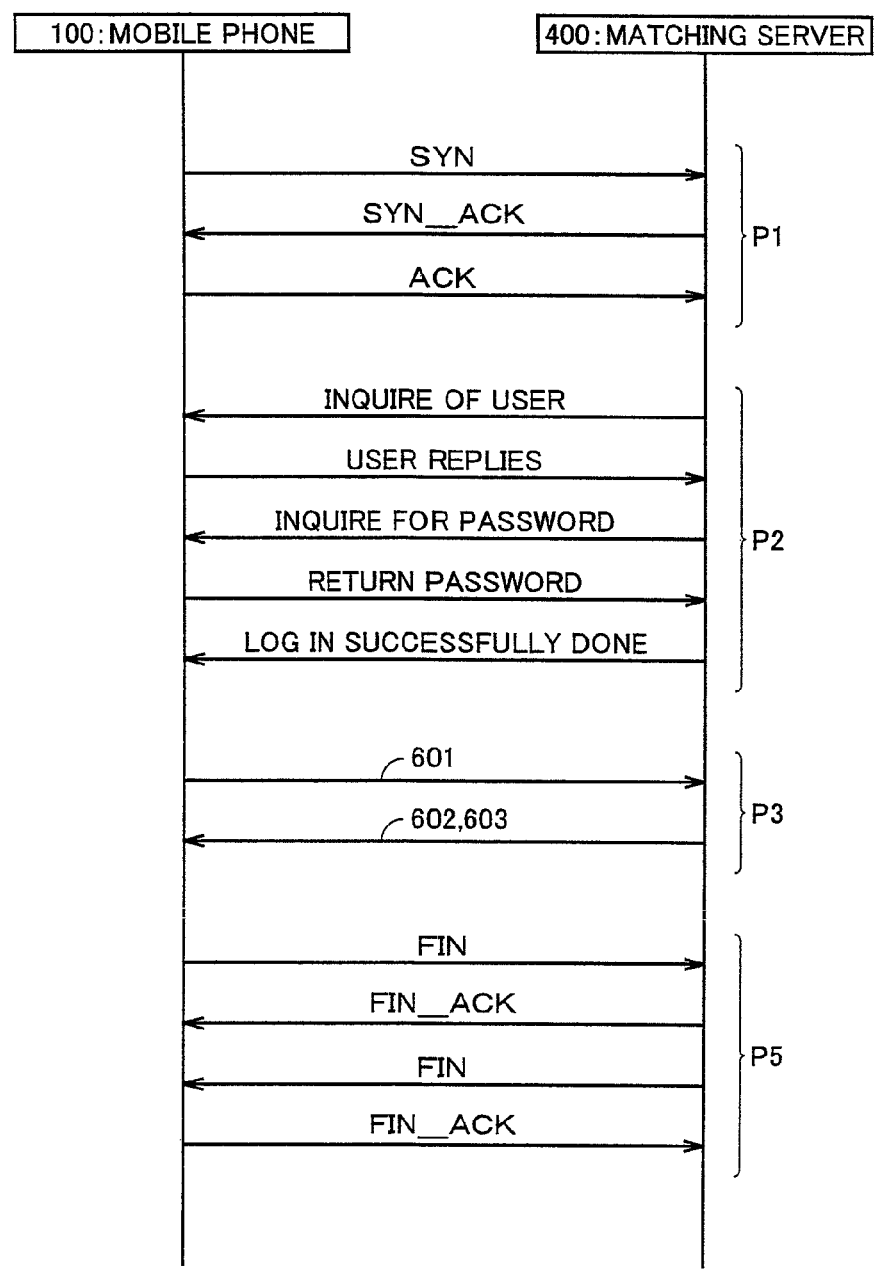
FIG. 15 represents a communication sequence of the room establishment process according to the present embodiment.

FIG. 15 shows a communication sequence between mobile phone 100 and matching server 400 in the chat room establishment process. Initially between mobile phone 100 and matching server 400 a connection process P1 is performed in accordance with a transmission control protocol (TCP). Connection process P1 corresponds to step T47. Connection process P1 is followed by a log in process P2. Log in process P2 corresponds to step T49. Subsequently, a chat room establishment process P3 is performed. For chat room establishment process P3, a communication process is performed, which corresponds to step T59 to step T67. When communication for chat room establishment process P3 ends, a disconnection process P5 is performed in accordance with the TCP. Disconnection process P5 ends communication between mobile phone 100 and matching server 400.

Presence Monitoring Process in Single Mode

First presence monitoring unit 1086 performs a presence monitoring process in the single mode, as will be described hereinafter with reference to the FIG. 16 flowchart.

When presence monitoring unit 1069 determines that the single mode has been designated via input receiving unit 1064 by the user operating tablet 119 or input unit 110, presence monitoring unit 1069 activates first presence monitoring unit 1086.

First presence monitoring unit 1086 starts a standby process for waiting for a request received from another mobile phone 100 for connection for P2P data communication (step T73). More specifically, whether a P2P connection request based on an IP address is received from another mobile phone 100 is detected via the terminal communication unit 1061 P2P communication unit 1081. The detection of whether the request is received is done for a period of time counted by time counting unit 105 for a predetermined period of time (step T75, step T81).

While the P2P data communication connection request is awaited, first presence monitoring unit 1086 detects whether connection is established via P2P communication unit 1081 for P2P communication with another mobile phone 100 (step T77). If so (YES at step T77), first presence monitoring unit 1086 ends the P2P data communication connection standby process (step T93). Subsequently, the control proceeds to a chat room deletion process.

If P2P data communication connection is not established for the period of time counted by time counting unit 105 for the predetermined period of time (NO at step T77), then, whether the user has operated Cancel button 110D of mobile phone 100 to cancel the P2P communication request is detected from an output of input receiving unit 1064 (step T79). If so (YES at step T79), first presence monitoring unit 1086 performs step T93 and proceeds to the chat room deletion process.

Otherwise (NO at step T79), first presence monitoring unit 1086 determines whether time counting unit 105 has counted the predetermined period of time (step T81). If not (NO at step T81), first presence monitoring unit 1086 returns to step T77 and repeats step T77 to step T81 similarly.

If first presence monitoring unit 1086 determines that time counting unit 105 has counted the predetermined period of time (YES at step T81), then, to detect whether presence information has changed, first presence monitoring unit 1086 instructs presence information collection unit 1066 to collect information. In response to the instruction, presence information collection unit 1066 collects and outputs presence information to first presence monitoring unit 1086.

First presence monitoring unit 1086 reads data 1029 of a presence condition from storage unit 103 (step T83), and inputs presence information input from presence information collection unit 1066 that is designated by the presence condition that data 1029 read indicates (step T85).

Subsequently, first presence monitoring unit 1086 compares the current presence information input at step T85 with presence information 1020 read from storage unit 103 that was obtained when a request to establish a room was made, and first presence monitoring unit 1086 detects from the comparison whether the former presence information has changed from the latter presence information (step T87). If it is determined from the comparison that the former presence information matches the latter presence information (NO at step T89), the control returns to step T75, and counting a predetermined period of time is started and the presence monitoring process continues.

If it is detected that the former presence information does not match the latter presence information, i.e., that the former has changed from the latter (YES at step T89), then, a process is performed as the presence information has changed (step T91). More specifically, first presence monitoring unit 1086 causes display unit 107 to display a message indicating "Presence information does not match designated condition. Chat room is deleted." The message may be indicated via notification processing unit 1065 by notification unit 111 audibly or by turning on a light emitting diode (LED) or a similar lamp. Subsequently, the control proceeds to step T93 and then shifts to the room deletion process.

While step T87 is performed to detect whether presence information has changed, the step may alternatively be performed as follows: the step may be performed to compare a room ID generated from the currently collected presence information with a room ID indicated by data 102B read from table 1028, and detect their variation.

Thus, in the single mode, steps T66, T67 and T70 liberate a user from searching for his/her desired chat room from currently established chat rooms to perform P2P data communication (chat communication), as a partner for communication can be found whose mobile phone has the same status, i.e., the same presence information (such as watching a broadcast program of the same channel, being located in an area, or the like), as the user's mobile phone 100. When first presence monitoring unit 1086 detects that presence information has a difference (or has changed) during a standby period for awaiting a P2P data communication request received from another mobile phone 100 after a chat room has been established, first presence monitoring unit 1086 forces the P2P data communication connection standby process to end and will shift to the chat room deletion process.

Figure 16:
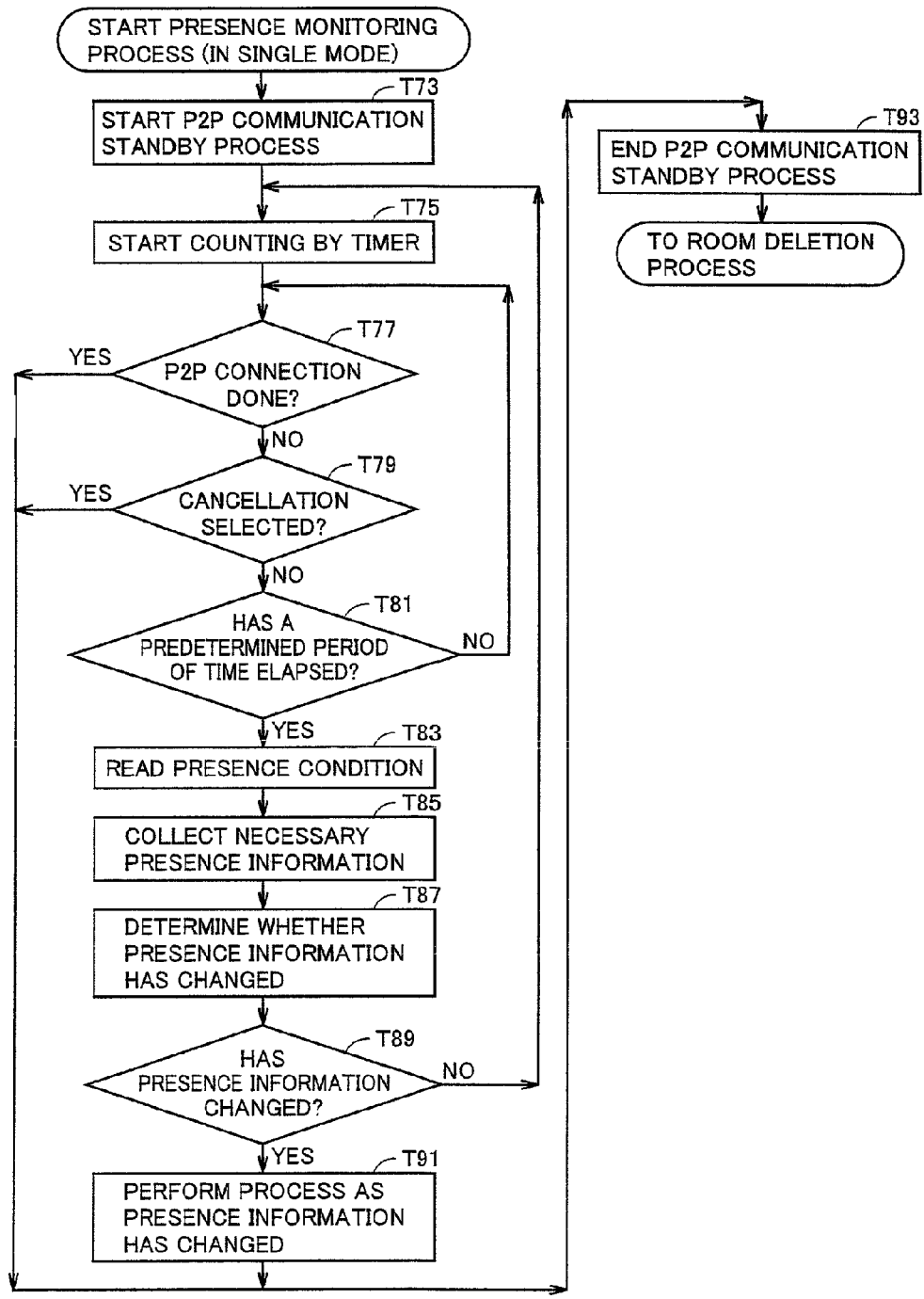
FIG. 16 is a flowchart of a presence monitoring process in the single mode according to the present embodiment.

According to the FIG. 16 flowchart, when the current presence information (i.e., the current status of mobile phone 100) no longer matches presence information provided when a request to establish a chat room was made to request starting a chat, receiving a request from another mobile phone 100 for chat communication can be avoided. As a result, the user of mobile phone 100 can have chat communication only with the user(s) of mobile phone(s) 100 that had presence information matching presence information provided when the chat was requested. If a chat room has been established, and presence information has changed and a chat request is no longer necessary, then the established chat room can automatically be deleted without the necessity of the user performing a particular operation.

Chat Room Deletion Process

With reference to the FIG. 17 flowchart, room deletion request unit 1070 performs the chat room deletion process, as will be described hereinafter.

Room deletion request unit 1070 starts the process for connection (or logging in) to matching server 400 via non P2P communication unit 1082 (step T100). The log in process is performed via an authentication process using user ID 1025 and password 1026 read from storage unit 103. Subsequently, time counting unit 105 starts counting a predetermined period of time (step T101). During this predetermined period of time, it is determined from a response received from matching server 400 whether connection to matching server 400 has successfully been established (step T103).

If successful connection is not detected (NO at step T103) and the predetermined period of time has elapsed (YES at step T117), then, a connection timeout occurs and a process therefor is performed (step T119). More specifically, room deletion request unit 1070 causes display unit 107 to display an error message ("failed to connect to server"), and ends a process performed for communication with matching server 400.

If successful connection is detected within the predetermined period of time (YES at step T103), room deletion request unit 1070 reads data 102B of a room ID from the storage unit 103 table 1028 (step T105). The read data 102B of the room ID is provided to frame generation unit 1063.

Room deletion request unit 1070 instructs frame generation unit 1063 to generate frame 604 of a request to delete a room. In response to the instruction, frame generation unit 1063 reads data from storage unit 103, and generates frame 604 of the request to delete the room, as based on the read data and data 102B of the room ID provided. The generated frame 604 of the request to delete the room is provided to terminal communication unit 1061. In terminal communication unit 1061, non P2P communication unit 1082 transmits to matching server 400 frame 604 of the request to delete the room (step T107).

Subsequently, time counting unit 105 starts to count a predetermined period of time for receiving a response to frame 604 of the request to delete the room, i.e., frame 605 of acceptance of deletion of the room (step T109). Room deletion request unit 1070 determines whether frame 605 of acceptance of deletion of the room is received from matching server 400 via non P2P communication unit 1082 (steps T111, T113).

When a frame is transmitted from matching server 400, it is received by terminal communication unit 1061 at non P2P communication unit 1082. The received frame is provided to frame analysis unit 1062. Frame analysis unit 1062 analyses the received frames data and from the analysis determines a type indicated in the received frame by frame data 611 and that data portion 620 has stored therein data 624 indicating that the deletion has been accepted, and thus determines that the received frame is frame 605 of acceptance of deletion of the room. Frame analysis unit 1062 outputs the decision to room deletion request unit 1070.

Room deletion request unit 1070 receives the decision from frame analysis unit 1062, and when room deletion request unit 1070 determines therefrom that frame 605 of acceptance of deletion of the room is received (YES at step T113), room deletion request unit 1070 performs a process as the chat room has successfully been deleted (step T115). More specifically, the flag of data 102A of table 1028 that corresponds to the deleted chat room is updated from "1" to "0". Then, display unit 107 displays a message "chat room deleted", or the deletion of the chat room is indicated via notification processing unit 1065 by notification unit 111 audibly and/or by an LED.

After frame 604 of the request to delete the room is transmitted, waiting for frame 605 of acceptance of deletion of the room to be received continues for a predetermined period of time (NO at step T113, NO at step T121).

The predetermined period of time has elapsed, and if frame 605 of acceptance of deletion of the room is still not received (YES at step T121), a process is performed as an error associated with a communication protocol has occurred (step T123). More specifically, display unit 107 displays an error message, or that the chat room is deleted is indicated via notification processing unit 1065 by notification unit 111 audibly or by an LED. The message is for example "no response from server." Subsequently, the process for communication with matching server 400 ends.

Figure 17:
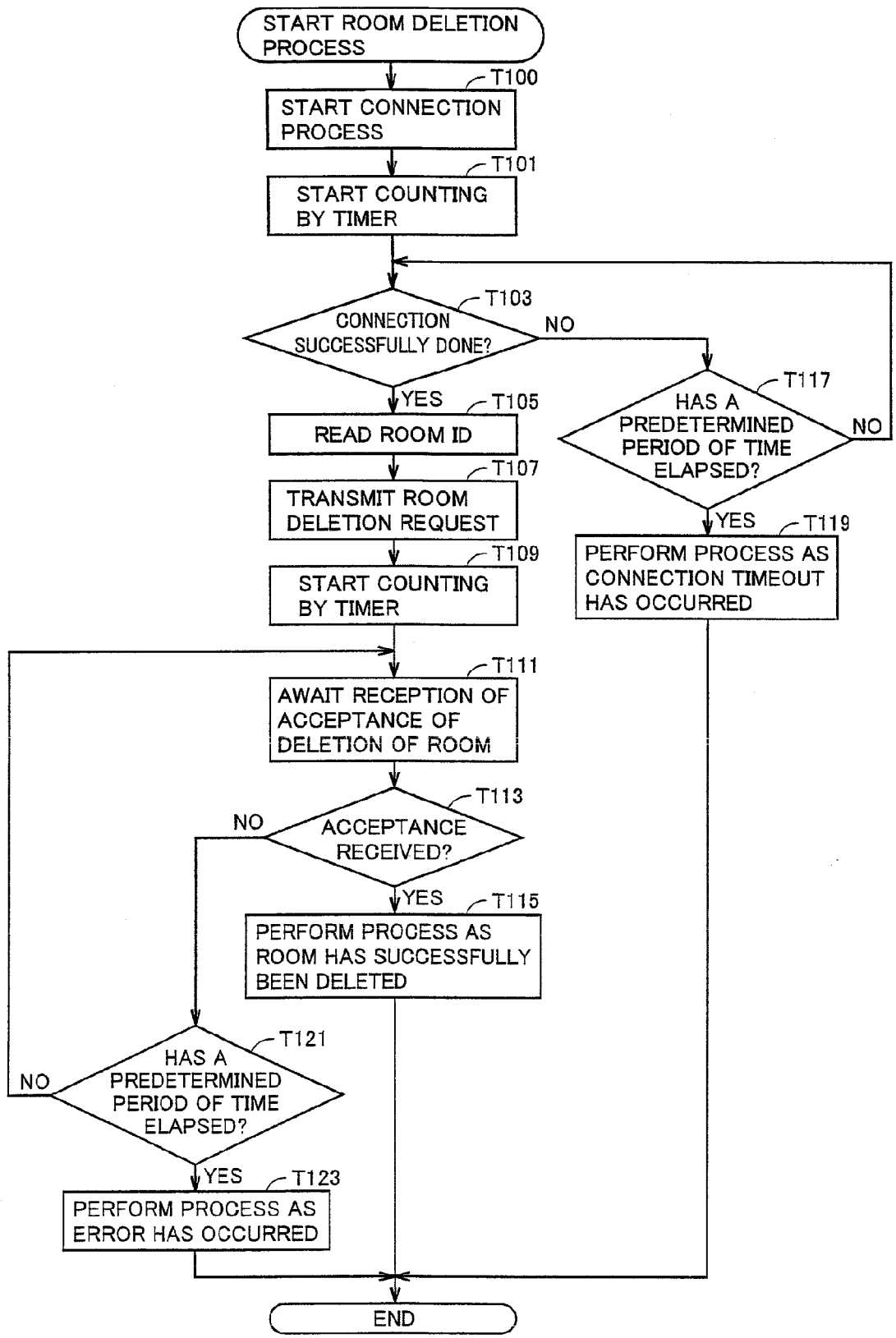
FIG. 17 is a flowchart of a room deletion process according to the present embodiment.
Figure 18:
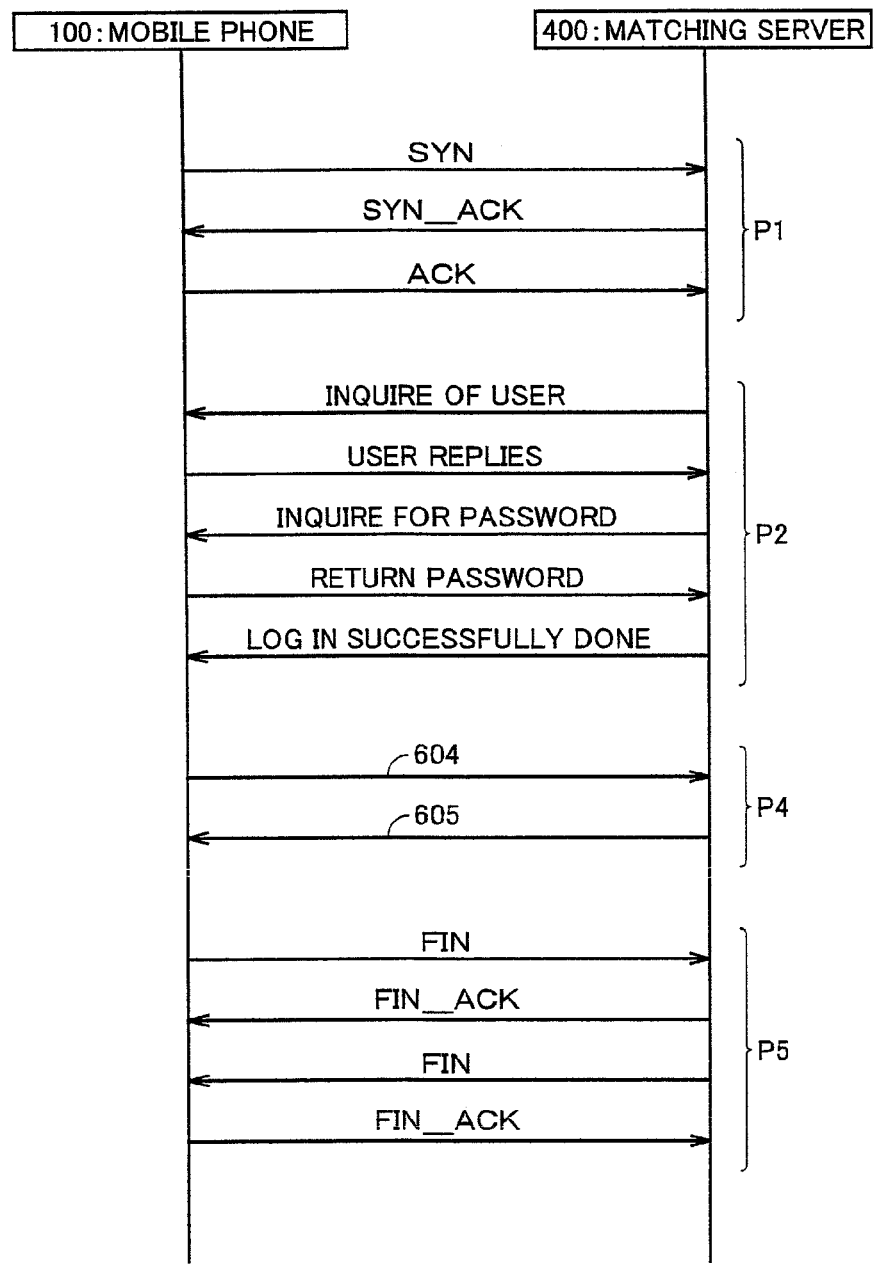
FIG. 18 represents a communication sequence of the room deletion process according to the present embodiment.

Reference will now be made to FIG. 18 to describe a sequence of communication done between mobile phone 100 and matching server 400 and involved in deleting a chat room. Initially, connection process P1 is performed in accordance with the TCP. Subsequently, log in process P2 is performed. Log in process P2 corresponds to the FIG. 17 step T100.

Subsequently, to delete an established chat room, a room deletion process P4 is performed. Room deletion process P4 corresponds to steps T107 to T113. Subsequently, TCP disconnection process P5 is performed to perform a process for disconnecting a communication line in accordance with the TCP.

Process in Matching Server in Single Mode

Figure 19:
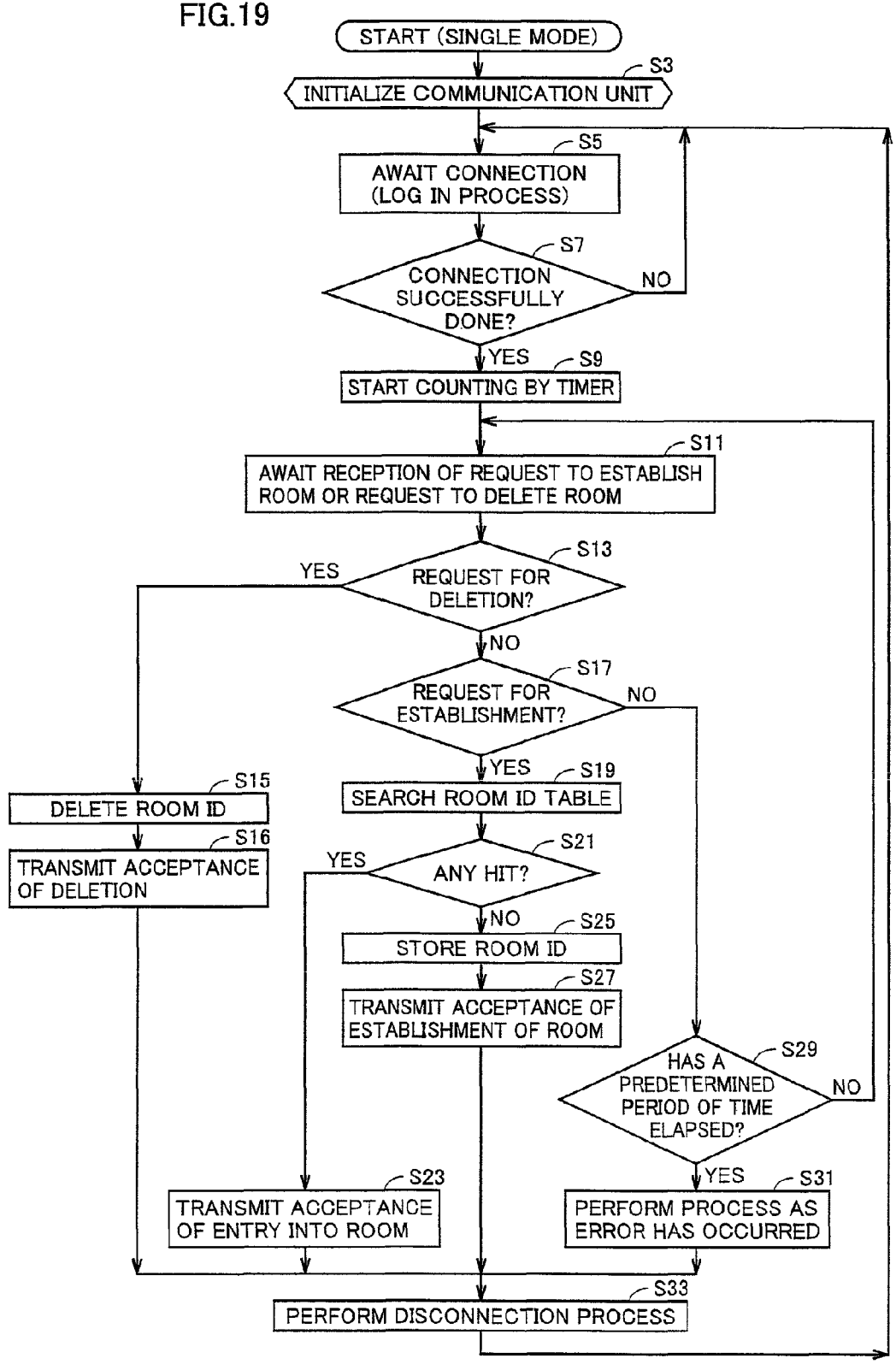
FIG. 19 is a flowchart of a process performed in a matching server in the single mode according to the present embodiment.

In the single mode, when mobile phone 100 performs the process for a request to establish/delete a room, matching server 400 performs an operation in accordance with the FIG. 19 flowchart.

With reference to FIG. 19, matching server 400 has server communication unit 409 initialized (step S3), and awaits being connected (or logged in) from mobile phone 100 via Internet 500 (step S5). If a decision is made that the log in process has successfully connected mobile phone 100 (YES in step S7), time counting unit 410 counts a predetermined period of time, within which receiving a frame from mobile phone 100 is awaited (step S11). In the log in process, mobile phone 100 notifies matching server 400 of a type of mode of operation (the single mode or the multimode), and matching server 400 operates in the indicated mode.

In the log in process, the authentication process is performed as follows: Based on a user ID and a password received from mobile phone 100, CPU 405 searches user ID/password table 43C stored in storage unit 426 and determines from a result of the search whether data that matches is stored. If the received user ID and password are stored in user ID/password table 43C, the authentication is successfully done and connection is permitted (YES in step S7). While the authentication is unsuccessfully done and connection is not permitted, step S5 is performed to repeat the log in process.

In step S11, when server communication unit 409 receives a frame via Internet 500, the received frame is provided to frame analysis unit 424. Frame analysis unit 424 determines from the type indicated in the received frame at header portion 610 by data 611 and the command indicated in the received frame at data portion 620 by instruction code 621 whether the received frame is frame 601 of a request to establish a room or frame 604 of a request to delete a room.

If frame analysis unit 424 determines that frame 604 of a request to delete a room is received (YES in step S13), then in step S15 the contents of frame 604 of the request to delete the room are provided from frame analysis unit 424 to room deletion unit 422. Room deletion unit 422 performs a process based on the contents of data portion 620 of the provided frame. More specifically, in accordance with a deletion command indicated by instruction code 621, room deletion unit 422 searches the storage unit 426 room ID table 43A, as based on a room ID indicated by data 622, and data 431 of a flag that corresponds to data 432 of a room ID that matches is updated from "1" to "0" (step S15). Thus, room ID table 43A has deleted therefrom the chat room of the room ID indicated by data 622. Subsequently, the control proceeds to step S16.

In step S16, frame 605 of acceptance of deletion of the room is transmitted to the requester mobile phone 100. More specifically, room deletion unit 422 notifies frame generation unit 423 that the room has been deleted. Frame generation unit 423 receives the notification and generates frame 605 of acceptance of deletion of the room. The generated frame 605 of acceptance of deletion of the room is provided to server communication unit 409. Server communication unit 409 receives frame 605 of acceptance of deletion of the room and transmits the frame via Internet 500 to mobile phone 100.

Subsequently, server communication unit 409 performs a process for severing the communication with mobile phone 100 (step S33). Subsequently, the control returns to step S5.

Returning to step S13, when frame analysis unit 424 detects that rather than frame 604 of a request to delete a room (NO in step S13), frame 601 of a request to establish a room is received (YES in step S17), the control proceeds to step S19.

In step S19, room attendance unit 421 performs a process in accordance with a resultant analysis of frame analysis unit 424 and as based on the contents of data portion 620 of the received frame 601 of the request to establish the room. More specifically, in accordance with a room establishment request command indicated by instruction code 621, room attendance unit 421 searches room ID table 43A, as based on a room ID indicated by data 622. As a result, if in room ID table 43A a room ID that matches is found and the flag of data 431 corresponding thereto indicates "1" (i.e., if there is a hit) (YES in step S21), frame 603 of acceptance of entry into the room is transmitted (step S23).

More specifically, the search result that room attendance unit 421 has obtained is provided to frame generation unit 423. Frame generation unit 423 receives the search result and in accordance therewith generates frame 603 of acceptance of entry into the room. The generated frame 603 of acceptance of entry into the room is transmitted via server communication unit 409 to mobile phone 100.

Frame 603 of acceptance of entry into the room is generated, as will be described hereinafter. Room attendance unit 421 searches room ID table 43A, and if room attendance unit 421 obtains a search result of a "hit", then room attendance unit 421 reads from room ID table 43A data 433 of an IP address corresponding to data 432 of a room ID that matches that room ID 622, and room attendance unit 421 provides the read data to frame generation unit 423. Frame generation unit 423 receives data 433 of the IP address and stores the received data as data 625 in frame 603 of acceptance of entry into the room that is generated.

Thus, a user transmits frame 601 of a request to establish a room and if room ID table 43A has the same room ID already stored therein (i.e., if the chat room has already been established), the IP address indicated by data 623 of the received frame 601 of the request to establish the room is additionally stored in room ID table 43A as data 433 corresponding to data 432 of the same room ID. Note that data 433 stored at the time in association with data 432 of that room ID indicates one or more IP addresses, which is/are stored to frame 603 of acceptance of entry into the room as data 625 and thus transmitted to the requester mobile phone 100. Thus, if a room that a user transmits frame 601 of a request to establish has already been established, the IP address of a chatting companion in the established chat room can be distributed to mobile phone 100 of the requester (or the user).

After server communication unit 409 has transmitted frame 603 of acceptance of entry into the room that has been generated by frame generation unit 423, the aforementioned disconnection process (step S33) is performed.

Returning to step S21, room ID table 43A is searched, and as a result if a "hit" is not detected (NO in step S21), in other words, if there is not registered in room ID table 43A data 432 of any room ID that matches, then, the chat room is established (step S25), and frame 602 of acceptance of establishment of the room is transmitted to the requester mobile phone 100 (step S27).

More specifically, if the room ID of the chat room requested to be established is unregistered in room ID table 43A (NO in step S21), room attendance unit 421 provides room establishment unit 420 with the result of searching room ID table 43A. Room establishment unit 420 receives the result and in accordance therewith establishes the chat room based on data portion 620 of frame 601 of the request to establish the room. More specifically, in accordance with an establishment command indicated in data portion 620 by instruction code 621, room establishment unit 420 associates the room ID indicated by data 622 and the IP address indicate by data 623 with each other and thus stores them to room ID table 43A. The flag indicated by data 431 corresponding to the stored data is set, at the time, to "1".

When room establishment unit 420 finished establishing the new room, room establishment unit 420 provides frame generation unit 423 with notification accordingly. Frame generation unit 423 generates the FIG. 25 frame 602 of acceptance of establishment of the room, as based on the data of the received frame 601 of the request to establish the room and the notification received from room establishment unit 420, and provides server communication unit 409 with the generated frame 602 of acceptance of establishment of the room. Server communication unit 409 receives frame 602 of acceptance of establishment of the room and transmits the frame to the requester mobile phone 100. Subsequently, the control shifts to the disconnection process (step S33).

Returning to step S17, if it is determined that the received frame is neither frame 604 of a request to delete a room nor frame 601 of a request to establish a room (NO in step S13, NO in step S17), then in step S29 it is determined whether a predetermined period of time has elapsed since the frame reception process started (step S29). While it is not determined that the predetermined period of time has elapsed, the control returns to step S11 and step S11 et seq. are similarly repeated.

If the predetermined period of time has elapsed and these frames are still not received (NO in step S29), CPU 405 performs a process as an error associated a protocol has occurred (step S31). For example, CPU 405 causes display unit 402 to display a message indicating that a protocol associated error has occurred. Subsequently, the control shifts to the disconnection process (step S33).

Thus, when matching server 400 receives a request to establish a chat room, room ID table 43A is searched, and if the chat room's room ID is unregistered, the room ID is registered to establish the chat room. If room ID table 43A has the room ID registered therein and matching server 400 receives a request indicating that room ID to establish a chat room, matching server 400 does not establish the chat room and notifies mobile phone 100 that the request to establish the chat room is accepted as entry into the chat room.

If matching server 400 receives a request to delete a chat room, i.e., if matching server 400 receives a deletion request from the user who has established the chat room, matching server 400 deletes the chat room's room ID from room ID table 43A, i.e., sets the flag of the corresponding data 431 to "0" to delete the chat room.

Herein the data 431 flag is updated to "1" or "0" to control establishing or deleting a chat room. However, how a chat room is deleted is not limited thereto. For example, data 431 to data 435 corresponding to a room ID of interest may all be deleted from room ID table 43A.

Process in Multimode

In the multimode a chat room is established/deleted in a process, as will be described hereinafter.

Room Establishment Process in Multimode

When room establishment request unit 1068 determines that the multimode is designated via input receiving unit 1064 by the user operating tablet 119 or input unit 110, room establishment request unit 1068 activates second room establishment request unit 1085.

Figure 20:
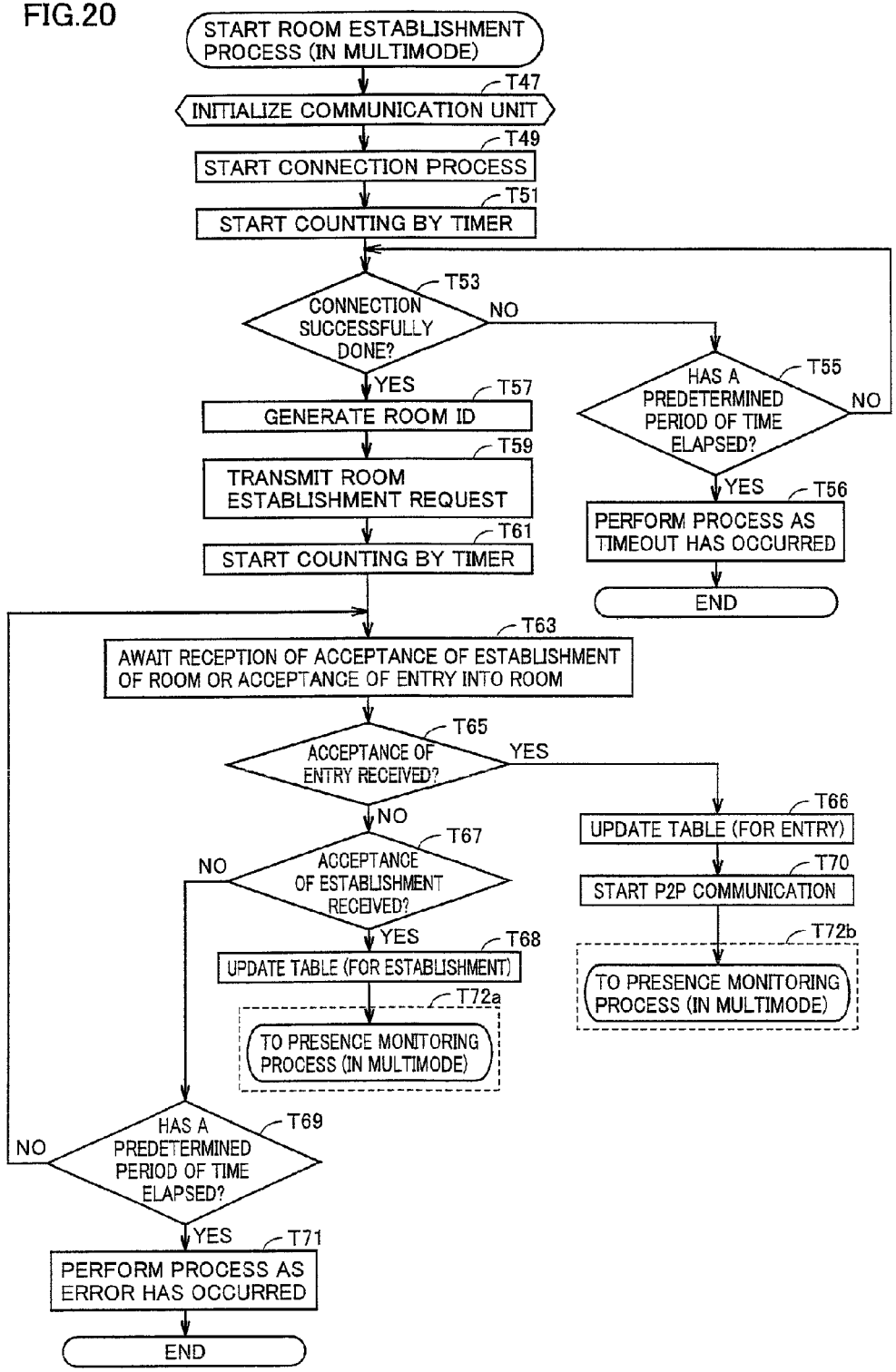
FIG. 20 is a flowchart of a room establishment process in a multimode according to the present embodiment.

FIG. 20 shows a chat room establishment process via second room establishment request unit 1085. The FIG. 20 flowchart differs from the FIG. 14 flowchart in that in FIG. 14 after step T70, i.e., after P2P data communication connection is started, only a process for P2P data communication is performed, whereas in FIG. 20, even after a process for connection for P2P data communication has been started (step T70), mobile phone 100 will have second presence monitoring unit 1087 performing a presence monitoring process (step T72*b*). Once a room has been established, second presence monitoring unit 1087 performs a presence monitoring process (step T72*a*). The remainder of FIG. 20 is the same as has been described with reference to FIG. 14. Accordingly it will not be described repeatedly.

Presence Monitoring Process in Multimode

When presence monitoring unit 1069 determines that the multimode is designated via input receiving unit 1064 by the user operating tablet 119 or input unit 110, presence monitoring unit 1069 activates second presence monitoring unit 1087.

Figure 21:
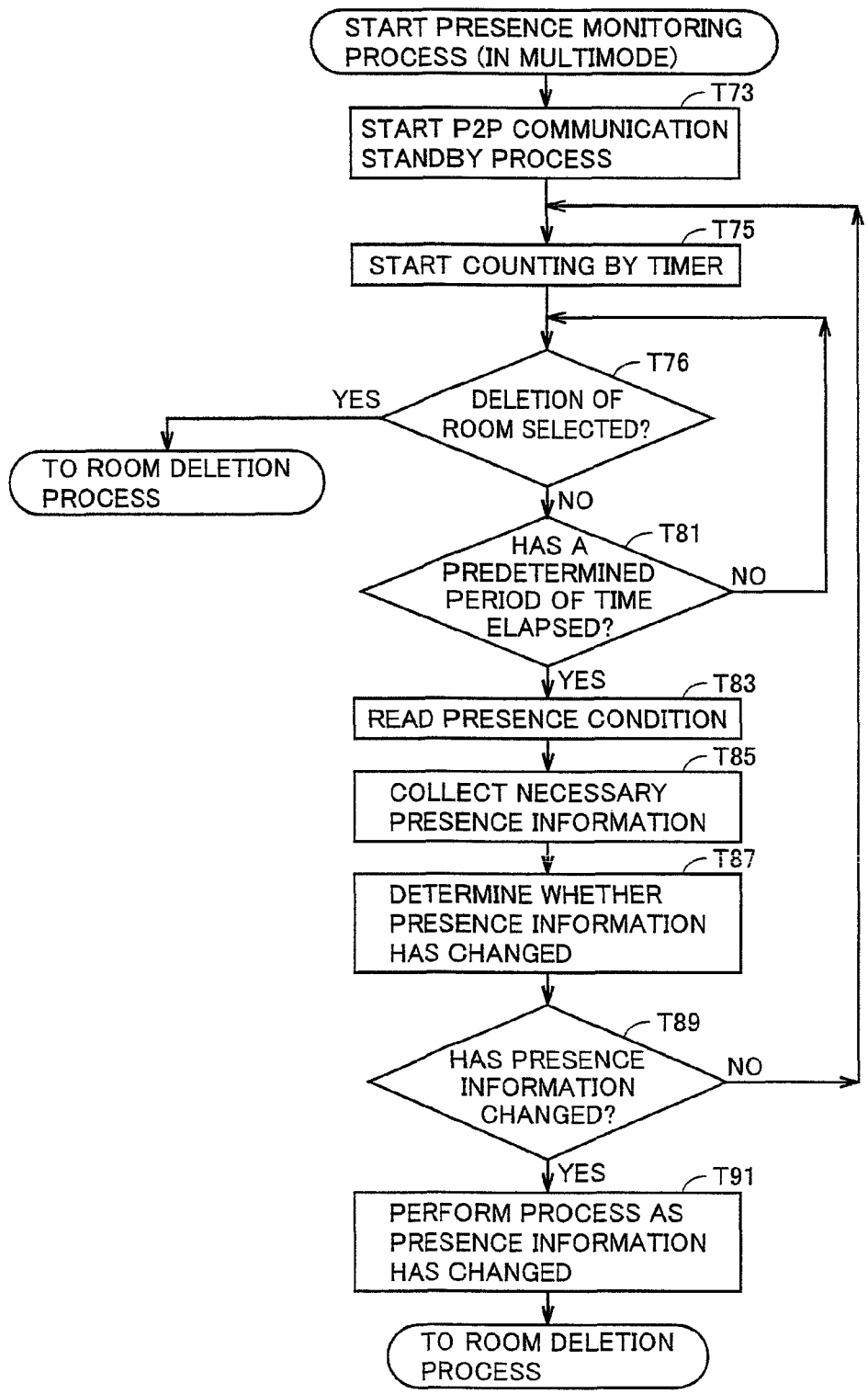
FIG. 21 is a flowchart of a presence monitoring process in the multimode according to the present embodiment.

Second presence monitoring unit 1087 performs a presence monitoring process in a procedure, as shown in FIG. 21.

The FIG. 21 flowchart differs from the FIG. 16 flowchart in that in FIG. 16, a request for connection for P2P data communication is awaited, and if therewhile presence information has changed, frame 604 of a request to delete a room is transmitted, whereas in FIG. 21, a request for connection for P2P data communication is awaited, and if therewhile the user operates button 112B to input an instruction to delete a room (YES at step T76) or presence information is detected as having changed (YES at step T89), frame 604 of a request to delete the room is transmitted. The remainder of FIG. 21 is similar to that of FIG. 16.

Thus in the multimode if the current presence information has changed from that provided when a request to establish a room was made, or if button 112B is operated by the user to request deleting a room, the FIG. 17 room deletion process is started. A user who is not the establisher of a chat room can also transmit a request to matching server 400 to delete the established chat room.

Process in Matching Server in Multimode

Figure 22:
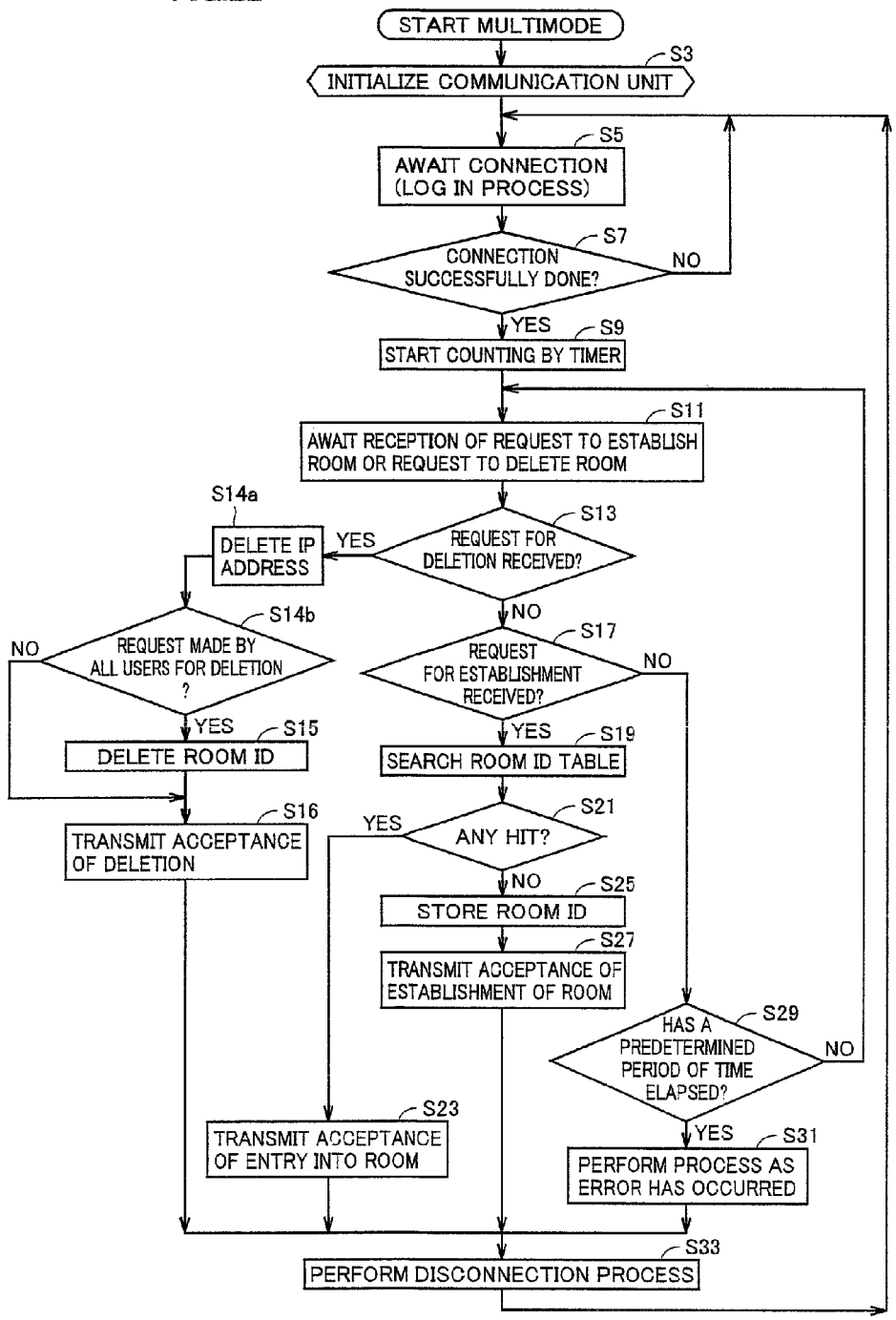
FIG. 22 is a flowchart of a process performed in the matching server in the multimode according to the present embodiment.

In the multimode, when mobile phone 100 performs the room establishment/deletion request processes, matching server 400 provides an operation in accordance with the FIG. 22 flowchart.

The FIG. 22 process differs from the FIG. 19 process in that the FIG. 22 process further includes steps S14*a* and S14*b*. The remainder of FIG. 22 is similar to that of FIG. 19. Accordingly hereinafter only the steps that differ from those of FIG. 19 will be described.

As has been described previously, when matching server 400 receives from mobile phone 100 frame 604 of a request to delete a room (YES in step S13), step S14*a* is performed.

In step S14*a*, the following process is performed. Initially, when frame analysis unit 424 receives via server communication unit 409 frame 604 of a request to delete a room, frame analysis unit 424 analyses the contents of data portion 620 of the received frame 604 of the request to delete the room, and in accordance with the analysis, provides the contents of data portion 620 of that frame to room deletion unit 422. In accordance with a command indicated by instruction code 621 of data portion 620 provided, room deletion unit 422 searches room ID table 43A, as based on the room ID indicated by data 622. Based on the search result, room deletion unit 422 detects that one of IP addresses indicated by data 433 corresponding to data 432 indicating a room ID matching the room ID of interest which is indicated by data 623 of frame 604 of the request to delete the room, and room deletion unit 422 updates the flag of the corresponding data 433 from "1" to "0". This deletes from room ID table 43A the IP address assigned to mobile phone 100 having transmitted frame 604 of the request to delete the room (i.e., sets it in an unreadable status). This cancels the entry in the room of the user of mobile phone 100 having transmitted frame 604 of the request to delete the room.

Subsequently, the control proceeds to step S14*b*. Initially, room deletion unit 422 determines whether data 434 updated in step S14*a* from "1" to "0" indicate that their flags all indicate a value of "0", i.e., whether the users who join the chat all request canceling their entries. If so (YES at step S14*b*), then in step S15 room deletion unit 422 deletes the corresponding room ID from room ID table 43A. This deletion process is similar to that aforementioned.

If all of the users in the chat room of the room ID still do not indicate requests to cancel their entries (NO at step S14*b*), the room ID is not deleted and the control proceeds to step S16. In step S16, as has been described previously, frame 605 of acceptance of deletion of the room is transmitted.

Thus in the multimode a user who has transmitted frame 604 of a request to delete a room can delete the IP address that is assigned to his/her mobile phone 100 in room ID table 43A from the group of IP addresses indicated by data 433 associated with the room ID of interest. The user's entry in the chat room is thus cancelled. Accordingly, the IP address of the user who has cancelled his/her entry will never be indicated to a user who thereafter enters the chat room.

If cancellation of entry has been done for all of the IP addresses indicated by data 433 in room ID table 43A that is associated with the room ID of interest, then the room ID can be deleted from room ID table 43A. In other words, when all of the users cancel their entries, the chat room is automatically deleted. This can eliminate the necessity of performing a particular process to delete data of an unnecessary chat room in room ID table 43A to delete the chat room.

In the present embodiment, a communication terminal including mobile phone 100 and matching server 400 establish and delete a chat room in a communication method, which can be provided as a program in accordance with such flowcharts as described above. Such a program can be stored previously in a storage medium that accompanies a computer of CPU 106A of mobile phone 100 and a computer of CPU 405 of matching server 400, and thus provided as a program product. Such a storage medium includes FD 412, CD-ROM 414, ROM and RAM constituting memory 406 or storage unit 103, and a memory card or a similar computer readable storage medium. Alternatively the program may be provided in a storage medium such as a hard disc incorporated in a computer. Furthermore, the program can also be provided by downloading it through a variety of networks including Internet 500. Note that the program product as referred to herein includes the program per se and the storage medium having the program stored therein. Such storage media include those which are not media used to store information temporarily (i.e., non-transitory).

In a general trend, a computer's operating system is partially prepared as a variety of program modules and an application program calls these modules in a predetermined sequence, as required, and proceeds with a process. In that case, software for implementing a system involved in establishing/deleting a chat room according to the present embodiment per se does not include such modules, and cooperates in the computer with the operating system to implement the system. However, as long as a general platform is used, it is not necessary to distribute software having such modules included therein, and the software per se that does not include these modules and a storage medium having the software stored therein (and a data signal when the software is distributed on a network) would configure an embodiment.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

Industrial Applicability

The present invention is effective in systems in which a plurality of communication terminals mutually communicate via a communication network having a server device.

DESCRIPTION OF THE REFERENCE SIGNS

100: mobile phone, 400: matching server, 420: room establishment unit, 421: room attendance unit, 422: room deletion unit, 423: frame generation unit, 424: frame analysis unit, 500: Internet, 600-605: frame, 700: carrier network, 1020: presence information, 1027: conversion rule data, 1029: presence condition, 43A: room ID table, 1066: presence information collection unit, 1067: presence condition determination unit, 1068: room establishment request unit, 1069: presence monitoring unit, 1070: room deletion request unit.

The invention claimed is:

1. A communication terminal configured to communicate with one or more other communication terminals via a communication network and a server device, comprising:
a presence detection unit configured to detect a status of the communication terminal;
a communication request unit configured to input a request for communication, via a room established in said server device for communicating data with said one or more other communication terminals;
an identification generation unit configured to generate room identification data based on the status detected by said presence detection unit for identifying said room;
a room establishment request unit operative in response to said communication request unit inputting said request for communication, for transmitting to said server device an establishment request including said room identification data generated by said identification generation unit for establishing said room;
a presence variation detection unit configured to detect that a current status of the communication terminal detected by said presence detection unit has changed from a status that said presence detection unit detected when said communication request unit input said request for communication; and
a room deletion request unit configured to transmit a deletion request including said room identification data generated by said identification generation unit to said server device for deleting said room when said presence variation detection unit has detected that the status of the communication terminal has changed.

2. The communication terminal according to claim 1, wherein:
the communication terminal is previously assigned terminal identification data identifying the communication terminal for communication via said communication network; and
when said room corresponding to said room identification data included in said establishment request transmitted by said room establishment request unit has already been established in said server device, the communication terminal receives from said server device said terminal identification data previously associated with said room identification data included in said establishment request.

3. The communication terminal according to claim 1, wherein:
the communication terminal is previously assigned terminal identification data identifying the communication terminal for communication via said communication network;
the communication terminal is configured to stand by after said room establishment request unit transmits said establishment request until a request using said terminal identification data for communication is received from any of said one or more other communication terminals; and
while the communication terminal stands by when said presence variation detection unit detects that the status of the communication terminal has changed, said room deletion request unit is configured to transmit to said server device said deletion request including said room identification data generated by said identification generation unit for deleting said room.

4. The communication terminal according to claim 1, wherein said presence detection unit is configured to detect at least a current position of the communication terminal as the status of the communication terminal.

5. The communication terminal according to claim 1, further comprising a broadcast reception unit configured to receive a broadcast signal, wherein said presence detection unit is configured to detect as the status of the communication terminal at least a channel of the broadcast signal currently received by said broadcast reception unit.

6. A communication method employing a computer included in a communication terminal communicating with one or more other communication terminals via a communication network connecting a server device, comprising the steps of:
said computer detecting a status of said communication terminal;
said computer inputting a request for communication, via a room established in said server device for communicating data with said one or more other communication terminals;
said computer generating room identification data, based on the status detected of said communication terminal, for identifying said room;
said computer operating in response to said request for communication being input to transmit to said server device an establishment request including said room identification data generated in the step of generating for establishing said room;
said computer detecting that a current status detected of said communication terminal has changed from a status detected in the step of detecting when said request for communication was input; and when said computer detects that the status of said communication terminal has changed, said computer transmitting to said server device a deletion request including said room identification data generated for deleting said room.

7. A non-transitory computer-readable medium having computer-executable instructions embodied thereon for causing a computer to execute the communication method according to claim 6.

8. A network system comprising:
a plurality of communication terminals and a server device interconnected via a communication network, said communication terminals each including
   a presence detection unit configured to detect a status of said communication terminal,
   a communication request unit configured to input a request for communication, via a room established in said server device for communicating data with one or more other communication terminals,
   an identification generation unit configured to generate room identification data based on the status detected by said presence detection unit for identifying said room,
   a room establishment request unit operative in response to said communication request unit inputting said request for communication, for transmitting an establishment request to said server device for establishing said room, said establishment request including said room identification data generated by said identification generation unit and terminal identification data assigned to said communication terminal for communication via said communication network,
   a presence variation detection unit configured to detect that a current status of said communication terminal detected by said presence detection unit has changed from a status that said presence detection unit detected when said communication request unit input said request for communication, and
   a room deletion request unit configured to transmit a deletion request including said room identification data generated by said identification generation unit to said server device for deleting said room when said presence variation detection unit has detected that the status of said communication terminal has changed, and said server device including a room storage unit for storing information of said room,
when said room is to be established in response to said establishment request received, said server device associating said room identification data and said terminal identification data of said establishment request received with each other in association with said room, and thus storing said data to said room storage unit,
said server device deleting in response to said deletion request from said room storage unit an association of said terminal identification data with said room identification data previously stored in said room storage unit.

* * * * *